United States Patent
Rochon et al.

(10) Patent No.: US 12,443,411 B1
(45) Date of Patent: Oct. 14, 2025

(54) SYSTEM AND METHOD OF AUGMENTED PLANOGRAMS THROUGH DIGITAL SIGNAGE

(71) Applicant: JDA Software Group, Inc., Scottsdale, AZ (US)

(72) Inventors: Benoît Rochon, Montreal (CA); Christopher Tyler, Montreal (CA)

(73) Assignee: Blue Yonder Group, Inc., Scottsdale, AZ (US)

(*) Notice: Subject to any disclaimer, the term of this patent is extended or adjusted under 35 U.S.C. 154(b) by 0 days.

(21) Appl. No.: 16/386,013

(22) Filed: Apr. 16, 2019

Related U.S. Application Data

(60) Provisional application No. 62/738,173, filed on Sep. 28, 2018.

(51) Int. Cl.
  *G06F 9/38*   (2018.01)
  *G06T 15/00*  (2011.01)
  *G09G 3/20*   (2006.01)

(52) U.S. Cl.
  CPC .......... *G06F 9/3836* (2013.01); *G06F 9/3877* (2013.01); *G06T 15/005* (2013.01); *G09G 3/20* (2013.01); *G09G 2380/04* (2013.01)

(58) Field of Classification Search
  CPC ... G06Q 10/06313; G06F 9/3836; G09G 3/20
  USPC ...................................... 705/7.23
  See application file for complete search history.

(56) References Cited

U.S. PATENT DOCUMENTS

| | | | | |
|---|---|---|---|---|
| 7,792,711 B2* | 9/2010 | Swafford, Jr. | ....... | G06Q 10/087 705/28 |
| 7,957,998 B2* | 6/2011 | Riley | ................. | G06Q 10/0631 705/28 |
| 8,321,302 B2* | 11/2012 | Bauer | .................. | G06Q 10/087 705/28 |
| 2005/0251462 A1* | 11/2005 | Nykamp | ............ | G06Q 30/0643 705/27.2 |

(Continued)

FOREIGN PATENT DOCUMENTS

| | | | | |
|---|---|---|---|---|
| DE | 0710916 A1 | * | 5/1996 | ............. G06F 3/147 |
| GB | 2228812 A | * | 9/1990 | ......... G06K 17/0022 |

OTHER PUBLICATIONS

Mankodiya, K., Gandhi, R., Narasimhan, P. (2012). Challenges and Opportunities for Embedded Computing in Retail Environments. Sensor Systems and Software. S-CUBE 2012. Lecture Notes of the Institute for Computer Sciences, Social Informatics and Telecommunications Engineering, vol. 102, 121-136 (Year: 2012).*

(Continued)

*Primary Examiner* — Kristin E Gavin
(74) *Attorney, Agent, or Firm* — Spencer Fane LLP; Steven J. Laureanti

(57) ABSTRACT

A system and method are disclosed for augmented planogram planning. Embodiments include a server comprising a processor and memory and an instruction builder. Embodiments further include a mobile device comprising a processor and a memory and configured to display instructions on the mobile device comprising rendered instruction blocks and at least one of the instruction blocks comprises a planogram instruction block. Embodiments additionally include a digital display comprising a processor and memory and the digital display is configured to display graphics comprising the rendered instruction blocks.

17 Claims, 13 Drawing Sheets

(56) References Cited

U.S. PATENT DOCUMENTS

| | | | | |
|---|---|---|---|---|
| 2009/0288030 | A1* | 11/2009 | Wahl | G06Q 10/06 715/772 |
| 2010/0070365 | A1* | 3/2010 | Siotia | G06Q 30/0251 705/28 |
| 2010/0106588 | A1* | 4/2010 | Jones | G06Q 30/0223 709/248 |
| 2012/0259697 | A1* | 10/2012 | Tadayon | H04N 21/47815 705/14.51 |
| 2012/0303154 | A1* | 11/2012 | Stiernagle | G06Q 30/0601 705/16 |
| 2013/0119138 | A1* | 5/2013 | Winkel | G06Q 10/087 235/462.1 |
| 2014/0324642 | A1* | 10/2014 | Winkel | G06Q 10/087 705/28 |
| 2015/0088701 | A1* | 3/2015 | Desmarais | G06Q 10/087 705/28 |
| 2015/0088703 | A1* | 3/2015 | Yan | G06Q 10/087 705/28 |
| 2015/0262120 | A1* | 9/2015 | Kulig | G06Q 30/0639 705/28 |
| 2016/0171405 | A1* | 6/2016 | Burke | G06Q 10/06313 705/7.23 |
| 2016/0328767 | A1* | 11/2016 | Bonner | G06Q 30/0256 |
| 2017/0011498 | A1* | 1/2017 | Yu | G06T 7/001 |
| 2017/0094588 | A1* | 3/2017 | Naqvi | G06Q 30/0261 |
| 2018/0005035 | A1* | 1/2018 | Bogolea | G06Q 10/087 |
| 2018/0225625 | A1* | 8/2018 | DiFatta | G06Q 10/087 |
| 2018/0300043 | A1* | 10/2018 | Graham | G06F 3/04842 |
| 2019/0188782 | A1* | 6/2019 | Howard | G09F 3/204 |

OTHER PUBLICATIONS

Souto, Luís Fernando Moreira. Optimizing Shelf Space Allocation under Merchandising Rules. MS thesis. Universidade do Porto (Portugal), 2018. (Year: 2018).*

"Intel Digital Shelf Display" video found at https://www.youtube.com/watch?v=jB5apnLNTuY Published Feb. 28, 2013.

"Kroger Digital Shelf Edge" video found at https://www.youtube.com/watch?v=w2vvcz-fki4 Published Oct. 30, 2014.

* cited by examiner

SYSTEM AND METHOD OF AUGMENTED PLANOGRAMS THROUGH DIGITAL SIGNAGE

CROSS-REFERENCE TO RELATED APPLICATIONS

The present disclosure is related to that disclosed in the U.S. Provisional Application No. 62/738,173, filed Sep. 28, 2018, entitled "System and Method of Augmented Planograms through Digital Signage." U.S. Provisional Application No. 62/738,173 is assigned to the assignee of the present application. The subject matter disclosed in U.S. Provisional Application No. 62/738,173 is hereby incorporated by reference into the present disclosure as if fully set forth herein. The present invention hereby claims priority under 35 U.S.C. § 119 (e) to U.S. Provisional Application No. 62/738, 173.

TECHNICAL FIELD

The present disclosure relates generally to planogram planning and execution and specifically to augmented planograms through digital signage.

BACKGROUND

The process and tools that currently support planogram execution are greatly inefficient. Planograms are typically created at a centralized location and then distributed to individual stores for implementation. This centralization creates many problems. For example, the stores lack efficient and robust communication channels with the location that creates the planograms and accompanying instructions. When these instructions are imprecise or erroneous, it is difficult for the employee who executes the planogram to receive support. This leads to bad execution of the planogram, which can negatively impact store revenue. The lack of effective communication channels also prevents feedback to provide useful or actionable information to the planogram planners, and the current top-down model impedes collaboration. Further, current strategies to assess compliance focus on a corrective approach only after a planogram is implemented at a store, and little, if any, useful data collection during planogram execution. A tremendous amount of resources are wasted attempting to resolve these problems and inefficiencies. These problems and inefficiencies are not currently addressed by current solutions.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
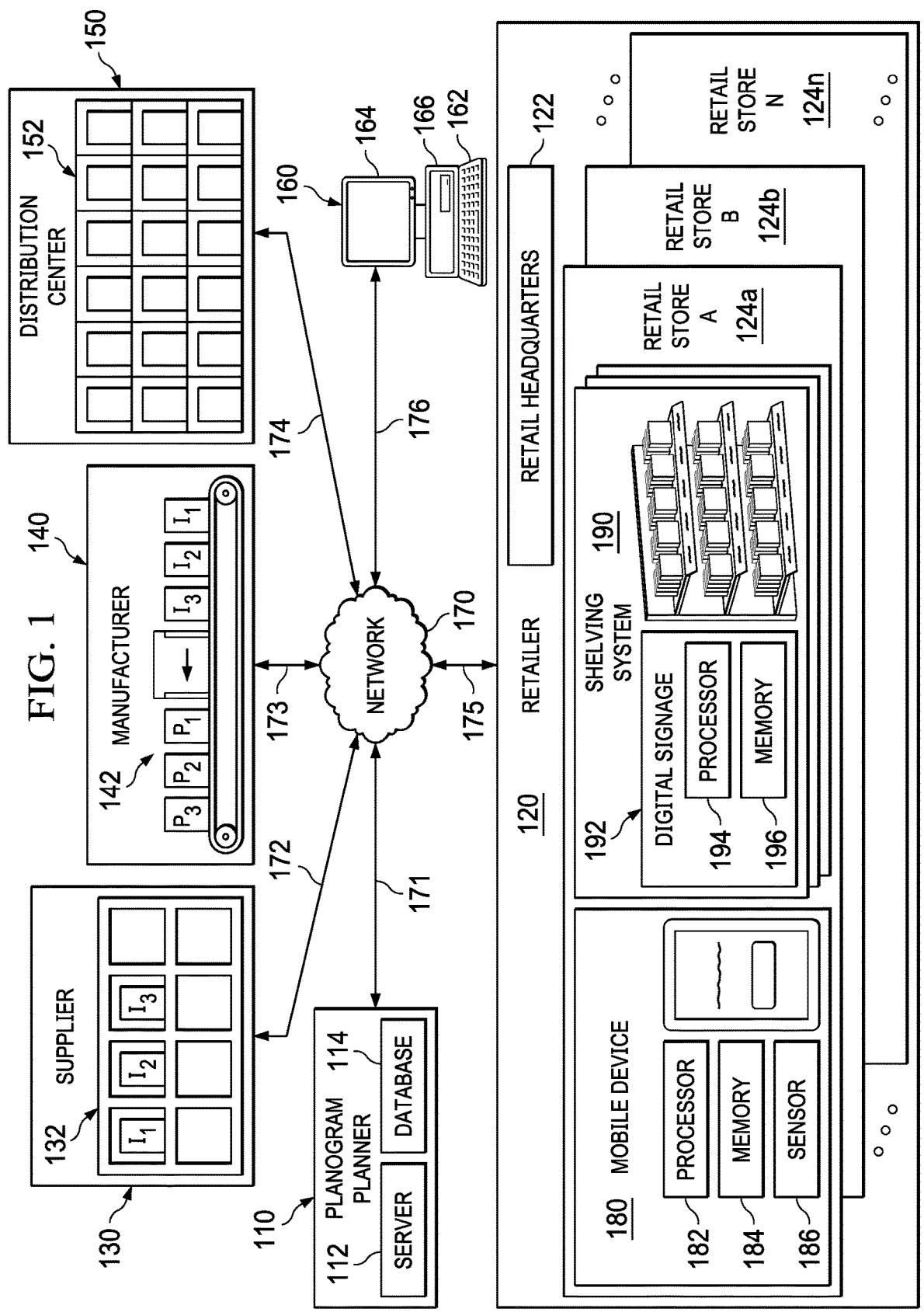
FIG. 1 illustrates an exemplary augmented planogram system, according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The arrangement of products at corporate retail stores is typically set by a corporate retail headquarters which sends a large set of generalized instructions for many types of shelving systems and products to all its stores. However, each store may have different products, different needs, and different types of shelving systems. A retail headquarters does not necessarily know with precision the type, size, and location of shelving system is in each store. By sending a general and large set of instructions for many types of shelving systems, the store employees need to sort through the large amount of information to find the appropriate information that fits their shelving system. Typically, the employees in a retail store are measured by productivity and are rushed through a planogram setup, which prevents employees from spending much time analyzing the planogram setup information.

Embodiments of the current disclosure describe systems and methods of presenting planograms and instruction sets to the employees in a simple, minimal information format to enable tasks to be completed faster and with better compliance. As described in more detail below, mobile devices display planogram and instructions information simultaneously with digital signage of a real-world shelving system. Each product on the shelving system may be mapped to a corresponding position on a planogram, such that, when viewing products on a mobile device one or more layers of information may be rendered on the digital signage of the shelving system to assist and guide the employee to arrange the products as instructed by the planograms and instructions.

For example, if the planogram calls for a product or products to be moved or restocked, embodiments contemplate displaying planogram information on a mobile device associated with the employee and also rendering animations, images, text, or any other rendering, display, or associated information on the digital signage of the shelving system. These renderings, display, or associated information may be displayed on the digital signage based on instructions and configurations from the planogram and may track the employee through the retail store. In this way, an employee may be able to see a planogram through the device, what is displayed on the digital display of the shelving system and be directed to the particular shelving that requires an adjustment of products based on the planogram.

FIG. 1 illustrates an exemplary augmented planogram system 100 according to a first embodiment. Augmented planogram system 100 comprises planogram planner 110, one or more retailers 120, one or more suppliers 130, one or more manufacturers 140, one or more distribution centers 150, computer 160, network 170, and communication links 171-176. Although a single planogram planner 110, one or more retailers 120, one or more suppliers 130, one or more manufacturers 140, one or more distribution centers 150, a single computer 160, and a single network 170, are shown and described, embodiments contemplate any number of planogram planners, retailers, suppliers, manufacturers, distribution centers, computers, or networks, according to particular needs.

In one embodiment, planogram planner 110 comprises server 112 and database 114. As explained in more detail below, server 112 of planogram planner 110 comprises one or more modules to design, store, and transmit planograms to one or more retailers 120. As discussed above, planograms may be sent to retailers 120 along with instructions that direct an employee to arrange products according to the planograms. As described in more detail below, server 112 may build instructions associated with the planograms using predefined content blocks. In addition, server 112 may generate one or more tasks comprising an instruction set, planogram, and additional information and assign specific tasks to particular retail locations, employees, locations within a retail store, or the like. As described in more detail below, tasks may comprise an instruction set and related planograms which are presented to an employee in a sequential manner with only one action visible at a time, to minimize the complexity of the task.

One or more retailers 120 may be any suitable entity that obtains one or more products to sell to one or more customers. One or more retailers 120 may comprise a corporate structure having retail headquarters 122 and one or more retail stores 124a-124n. Retail headquarters 122 comprises a central planning office with oversight of one or more retail stores 124a-124n. Retail stores 124a-124n may comprise any online or brick-and-mortar store, including stores with shelving systems 190. One or more retail stores 124a-124n of retailer 120 may sell products according to rules, strategies, orders, and/or guidelines developed by retail headquarters 122. For example, retail headquarters 122 may create planograms and instruction sets that are packaged as tasks and received by one or more retail stores 124a-124n to direct how to display for sale one or more products. Retail headquarters 122 may design planograms to, for example, increase sales to customers of particular customer segments by relocating the products identified as highly appealing to these customers. Relocating the highly-appealing products may comprise moving all the products to one side, spreading the products throughout different areas, or locating the products at opposite ends of a shelf space, which causes the customer's eyes to travel across the entire shelf space and increases the chance of the customer purchasing more products than the customer intended.

According to embodiments, one or more retail stores 124a-124n execute one or more tasks using mobile device 180 and shelving system 190. Mobile device 180 comprises one or more processors 182, memory 184, one or more sensors 186, and may include any suitable input device, output device, fixed or removable computer-readable storage media, or the like. Mobile device 180 may comprise one or more networked handheld mobile devices configured to receive planograms, instruction sets, and tasks from planogram planner 110. Mobile device 180 may comprise, for example, a smartphone, a tablet computer, a wireless handheld device, or the like.

Mobile device 180 receives one or more tasks from planogram planner 110 and displays graphics, images, and text that provide for selecting and executing tasks and performing one or more actions associated with a selected task. Upon selection of a particular task, one or more mobile devices 180 display a planogram and instruction set associated with the task. In addition, the transmitted tasks may include an interactive planogram that synchronizes display of the instruction set and planogram on mobile device 180 with digital signage 192.

Shelving system 190 of one or more retailers 124a-124n comprise various racks, fixtures, brackets, notches, grooves, slots, or other attachment devices for fixing shelves in various configurations to display one or more products for sale. These configurations may comprise shelving with adjustable lengths, heights, and other arrangements, which may be adjusted by an employee of retailer 120 using computer-generated instructions displayed on one or more mobile devices 180 or automatically by machinery that place products in the appropriate location on shelving systems 190 or adjusts shelving systems 190 as indicated by planograms, instruction sets, and/or tasks. Although planogram execution may be performed by a retail employee, embodiments contemplate automated configuration of shelving and retail displays. This may include, for example, automated robotic shelving machinery that places products on shelves or automated shelving that automatically adjusts based, at least in part, on planograms and instruction sets determined by planogram planner 110, mappings of one or more items in a supply chain network, and/or one or more other factors described herein.

In addition, shelving system 190 of one or more retail stores 124a-124n comprise digital signage 192. According to embodiments, digital signage 192 comprises digital displays coupled with shelving system 190, which may be programmed to display animations, images, text, or the like at specific locations on shelving systems 190. Digital signage 192 may comprise processor 194 and associated memory 196 to execute instructions for rendering animation, graphics, or text on the digital displays received from planogram planner 110 and/or mobile device 180.

According to embodiments, digital signage 192 may be placed on the front edge of each shelf of shelving system 190. Digital signage 192 may comprise a coordinates-based location system that allows for displaying a desired animation, graphic, or text at a particular addressable location, such as at a particular coordinate associated with a particular product location or a shelf location, at a particular distance from an end of a particular shelf, on particular aisles, or the like. Digital signage 192 may display information beneath products that provide additional information about the product such as, for example, pricing information, product details, sales information, and the like. As described in more detail below, planogram planner 110 renders instructions and planograms as animations, graphics, and text that are displayed on digital signage 192 in synchronization with animations, graphics, and text displayed on mobile device 180 to provide an interactive augmented planogram. The interactive augmented planogram displays on digital signage 192 context-specific and location-specific instructions in the physical world of an employee executing one or more tasks on mobile device 180 in connection with altering the arrangement of products on shelving system 190 of one or more retailers 124a-124n.

In addition, or as an alternative, product placement may change frequently in a retail store environment. These changes may be caused by, for example, adding or removing product from a product assortment, stock outs, seasonality of an item requiring more or less shelf space, product promotions, or various other considerations. For example, a particular juice brand may have requested to be placed on the top of a display, and another brand may have requested below. Often the product placement and shelving configurations are determined by retail headquarters 122 and communicated to one or more retail stores 124a-124n by planograms and instructions. A retail store employee may then execute the planogram and document or verify that the product placement reflects the latest planogram and instructions.

According to embodiments, retailer 120 may locate one or more items by scanning a product identifier associated with the item, an image of an item by sensor 186 of mobile device 180, or by searching entered product information. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to retailers 120, computers 160, mobile device 180, shelving system 190, and/or digital signage 192 based, as least in part, on one or more differences between the first mapping and the second mapping such as, for example, to locate an item to add to or remove from a shelf or inventory of one or more retailers 120 or a shipment to or from one or more retailers 120, suppliers 130, manufacturers 140, distribution centers 150, and/or customers.

One or more retailers 120, one or more suppliers 130, one or more manufacturers 140, and one or more distribution centers 150 may comprise one or more supply chain entities of one or more supply chain networks. One or more supply chain networks may include one or more enterprises, such as, for example networks of one or more retailers 120, one or more suppliers 130, one or more manufacturers 140, one or more distribution centers 150, customers, and/or the like.

Suppliers 130 may be any suitable entity that offers to sell or otherwise provides one or more items (i.e., materials, components, or products) to one or more manufacturers 140. Items may comprise, for example, parts or supplies used to generate products. According to some embodiments, items comprise foods or ingredients. Each of the one or more items may be represented in supply chain network 100 by an identifier, including, for example, Stock-Keeping Unit (SKU), Universal Product Code (UPC), serial number, barcode, tag, RFID, or other identifier. Suppliers 130 may comprise automated distribution systems 132 that automatically transport products to one or more manufacturers 140 based, at least in part, on planograms and instruction sets determined by planogram planner 110, mappings of one or more items in the supply chain network, and/or one or more other factors described herein.

Manufacturers 140 may be any suitable entity that manufactures at least one product. Manufacturers 140 may use one or more items during the manufacturing process to produce any manufactured, fabricated, assembled, or otherwise processed item, material, component, good, or product. In one embodiment, a product represents an item ready to be supplied to, for example, one or more retailers 120, or other supply chain entity, an item that needs further processing, or any other item. Manufacturers 140 may, for example, produce and sell a product to retailers 120, suppliers 130, other manufacturers 140, distribution centers 150, a customer, or any other suitable person or entity. Manufacturers 140 may comprise automated robotic production machinery 142 that produce products based, at least in part, on planograms and instruction sets determined by planogram planner 110, mappings of one or more items in the supply chain networks, and/or one or more other factors described herein.

Distribution centers 150 may be any suitable entity that offers to store or otherwise distribute at least one product to one or more retailers 120 and/or customers. Distribution centers 150 may, for example, receive a product from a first supply chain entity and store and transport the product for a second supply chain entity. Distribution centers 150 may comprise automated warehousing systems 152 that automatically remove products from and place products into inventory based, at least in part, on planograms and instruction sets determined by planogram planner 110, mappings of one or more items in the supply chain networks, and/or one or more other factors described herein.

Although one or more retailers, suppliers, manufacturers, and distribution centers are shown and described as separate and distinct entities, the same entity may simultaneously act as more than one supply chain entity. For example, a supply chain entity acting as manufacturer 140 can produce a product, and the same supply chain entity can act as supplier 130 to supply an item to itself or another supply chain entity. Although one example of a supply chain network is shown and described, embodiments contemplate any configuration of a supply chain network, without departing from the scope described herein.

As shown in FIG. 1, augmented planogram system 100 operates on one or more computers 160 that are integral to or separate from the hardware and/or software that support planogram planner 110, one or more retailers 120, one or more suppliers 130, one or more manufacturers 140, and one or more distribution centers 150. Augmented planogram system 100 comprising planogram planner 110, one or more retailers 120, one or more suppliers 130, one or more manufacturers 140, and one or more distribution centers 150 may operate on one or more computers 160 that are integral to or separate from the hardware and/or software that support planogram planner 110, one or more retailers 120, one or more suppliers 130, one or more manufacturers 140, and one or more distribution centers 150. Computers 160 may include any suitable input device 162, such as a keypad, mouse, touch screen, microphone, or other device to input information. Output device 164 may convey information associated with the operation of augmented planogram system 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to augmented planogram system 100.

Computer 160 may include one or more processors 166 and associated memory to execute instructions and manipulate information according to the operation of augmented planogram system 100 and any of the methods described herein. One or more processors 166 may execute an operating system program stored in memory to control the overall operation of computer 160. For example, one or more processors 166 control the reception and transmission of signals within the system. One or more processors 166 execute other processes and programs resident in memory, such as, for example, registration, identification or communication and moves data into or out of the memory, as required by an executing process. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein.

In addition, and as discussed herein, augmented planogram system 100 may comprise a cloud-based computing system having processing and storage devices at one or more locations, local to, or remote from planogram planner 110, one or more retailers 120, one or more suppliers 130, one or more manufacturers 140, and one or more distribution centers 150. In addition, computer 160 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with planogram planner 110, one or more retailers 120, one or more suppliers 130, one or more manufacturers 140, and one or more distribution centers 150. In an embodiment, one or more users may be associated with planogram planner 110. These one or more users may include, for example, a "manager," a "planner" or an "employee" handling planogram planning and execution and/or one or more related tasks within the system. In addition, or as an alternative, these one or more users within the system may include, for example, one or more computers programmed to autonomously handle, among other things, planogram planning, shelving resets, task management, and/or communication and assignment of planograms and instructions.

In one embodiment, planogram planner 110 may be coupled with network 170 using communications link 171, which may be any wireline, wireless, or other link suitable to support data communications between planogram planner 110 and network 170 during operation of augmented planogram system 100. One or more retailers 120 are coupled with network 170 using communications link 172, which may be any wireline, wireless, or other link suitable to support data communications between one or more retailers 120 and network 170 during operation of distributed augmented planogram system 100. One or more suppliers 130 may be coupled with network 170 using communications link 172, which may be any wireline, wireless, or other link suitable to support data communications between one or more suppliers 130 and network 170 during operation of augmented planogram system 100. One or more manufacturers 140 may be coupled with network 170 using communications link 173, which may be any wireline, wireless, or other link suitable to support data communications between one or more manufacturers 140 and network 170 during operation of augmented planogram system 100. One or more distribution centers 150 may be coupled with network 170 using communications link 174, which may be any wireline, wireless, or other link suitable to support data communications between one or more distribution centers 150 and network 170 during operation of augmented planogram system 100. Computer 160 may be coupled with network 170 using communications link 176, which may be any wireline, wireless, or other link suitable to support data communications between computer 160 and network 170 during operation of augmented planogram system 100.

Although communication links 171-176 are shown as generally coupling one or planogram planner 110, one or more retailers 120, one or more suppliers 130, one or more manufacturers 140, one or more distribution centers 150, and computer 160 to network 170, any of planogram planner 110, one or more retailers 120, one or more suppliers 130, one or more manufacturers 140, one or more distribution centers 150, and computer 160 may communicate directly with each other, according to particular needs.

In another embodiment, network 170 includes the Internet and any appropriate local area networks (LANs), metropolitan area networks (MANs), or wide area networks (WANs) coupling planogram planner 110, one or more retailers 120, one or more suppliers 130, one or more manufacturers 140, one or more distribution centers 150, and computer 160. For example, data may be maintained locally to, or externally of planogram planner 110, one or more retailers 120, one or more suppliers 130, one or more manufacturers 140, one or more distribution centers 150, and computer 160 and made available to one or more associated users of planogram planner 110, one or more retailers 120, one or more suppliers 130, one or more manufacturers 140, one or more distribution centers 150, and computer 160 using network 170 or in any other appropriate manner. For example, data may be maintained in a cloud database at one or more locations external to planogram planner 110, one or more retailers 120, one or more suppliers 130, one or more manufacturers 140, one or more distribution centers 150, and computer 160 and made available to one or more associated users of planogram planner 110, one or more retailers 120, one or more suppliers 130, one or more manufacturers 140, one or more distribution centers 150, and computer 160 using the cloud or in any other appropriate manner. Those skilled in the art will recognize that the complete structure and operation of network 170 and other components within augmented planogram system 100 are not depicted or described. Embodiments may be employed in conjunction with known communications networks and other components.

Figure 2:
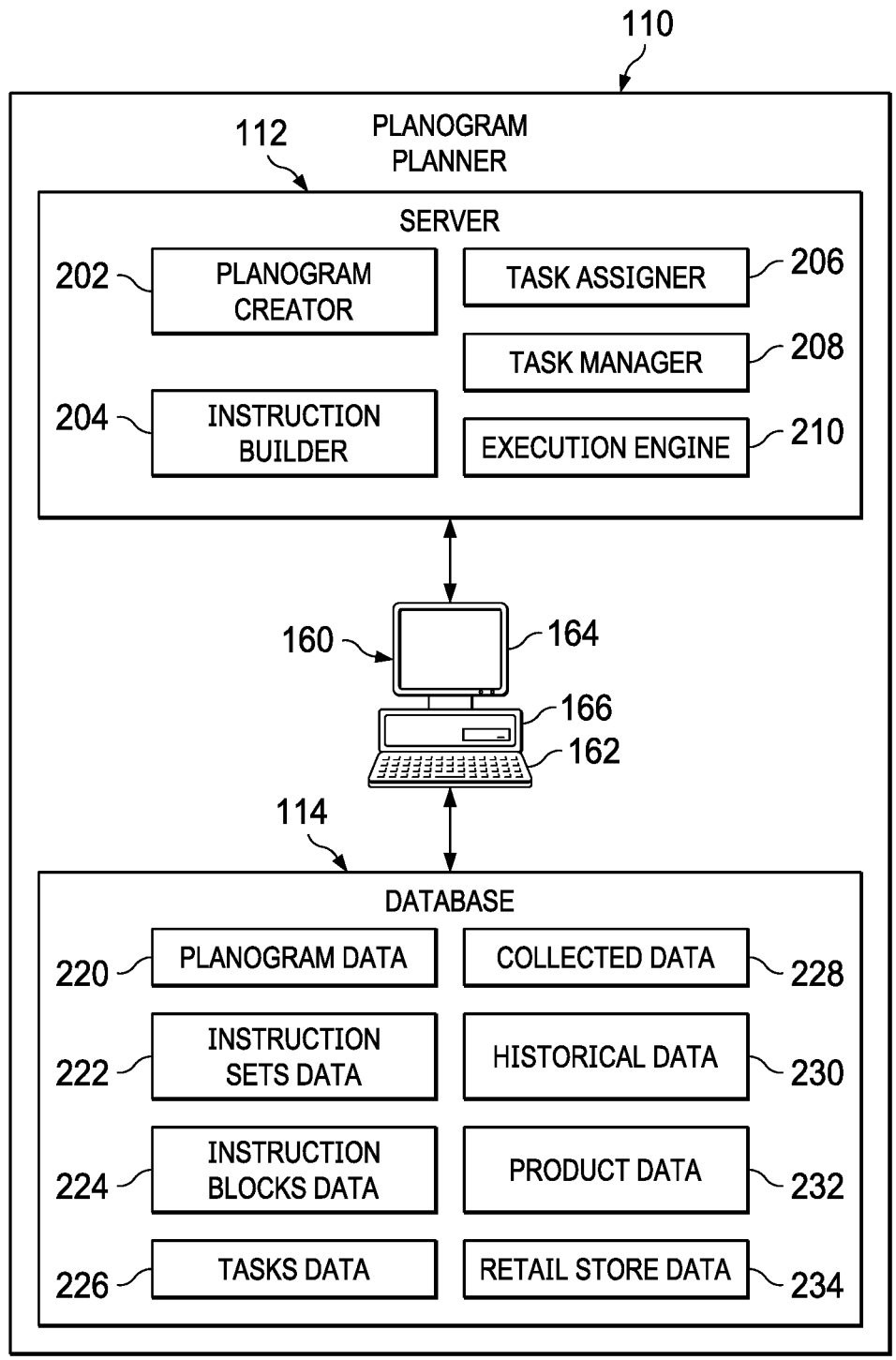
FIG. 2 illustrates the planogram planner of FIG. 1 in greater detail in accordance with an embodiment.

FIG. 2 illustrates planogram planner 110 of FIG. 1 in greater detail in accordance with an embodiment. As discussed above, planogram planner 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, planogram planner 110 comprises server 112 and database 114. Although planogram planner 110 is shown as comprising a single computer 160, a single server 112 and a single database 114, embodiments contemplate any suitable number of computers, servers, or databases internal to or externally coupled with planogram planner 110. According to some embodiments, planogram planner 110 comprises one or more servers and one or more databases internal to retail headquarters 122, one or more retail stores 124a-124n, or both. In other embodiments, planogram planner 110 comprises one or more servers and one or more databases external to retail headquarters 122 and one or more retail stores 124a-124n, such as, for example, remotely located at one or more cloud-based computing systems.

Server 112 of planogram planner 110 may comprise planogram creator 202 instruction builder 204, task assigner 206, task manager 208, and execution engine 210. Planogram creator 202 comprises a module to design, store, modify, and transmit planograms to mobile devices 180 and digital signage 192 of shelving systems 190 of one or more retailers 124a-124n.

Instruction builder 204 comprises a module to build instruction sets from instruction blocks and packaged with planograms for rendering and display on mobile device 180 and digital signage 192. Task assigner 206 comprises a module to store and retrieve tasks in database 114 and assign tasks to one or more retail stores 124a-124n. Task manager 208 may render for display on mobile device 180 a list of tasks assigned to one or more retail stores 124a-124n and provide for prioritizing tasks, assigning tasks to particular employees, and viewing task statuses, such as, for example, whether the tasks have been dispatched, completed, not received, or any other like status.

Execution engine 210 comprises a module that receives planograms and instruction sets for tasks and renders the planograms and instruction sets as an interactive and ordered sequence of actions required to perform the task. Execution engine 210 renders device-specific instructions to generate device-specific animations, graphics, text, visualizations of augmented interactive planograms, and the like. Execution engine 210 may receive a task comprising a single instruction set and a single planogram, and render the instruction set and planogram to display an augmented interactive planogram comprising a sequence of text and graphic instructions on mobile device 180 and synchronized location-specific symbols and text on digital signage 192, as described in more detail below.

Although server 112 is shown and described as comprising a single planogram creator 202 instruction builder 204, task assigner 206, task manager 208, and execution engine 210 embodiments contemplate any suitable number or combination of these located at one or more locations, local to, or remote from planogram planner 110, such as on multiple servers or computers at any location in augmented planogram system 100.

Database 114 of planogram planner 110 may comprise one or more databases or other data storage arrangement at one or more locations, local to, or remote from, server 112. Database 114 comprises, for example, planogram data 220, instruction sets data 222, instruction blocks data 224, tasks data 226, collected data 228, historical data 230, product data 232, and retail store data 234. Although, database 114 is shown and described as comprising planogram data 220, instruction sets data 222, instruction blocks data 224, tasks data 226, collected data 228, historical data 230, product data 232, and retail store data 234 embodiments contemplate any suitable number or combination of these, located at one or more locations, local to, or remote from, planogram planner 110 according to particular needs.

Database 114 of planogram planner 110 stores one or more planograms as planogram data 220. In one embodiment, planograms comprises a physical or digital representation of the arrangement of products on a shelf or other retail display. According to some embodiments, planograms comprise images of products arranged in the same layout as the products will appear on shelving system 190 of one or more retail stores 124a-124n when executed correctly.

According to other embodiments, planograms comprise one or more digital formats that represent products and product placement as sequences of data structures that may be more easily transmitted, modified, and displayed by modules or components of planogram planner 110, computer 160, mobile device 180, and/or digital signage 192 of augmented planogram system 100.

Database 114 stores one or more instruction sets as instruction sets data 222. According to embodiments, instructions sets comprise particular actions, inquiries, care instructions, or additional information which may be coupled with a planogram in order to clarify actions to be taken at the store level in connection with one or more tasks. As described above, instruction builder 204 constructs instruction sets from one or more instruction blocks.

Database 114 stores one or more instructions blocks as instruction blocks data 224. Specification Instruction blocks comprise placeholders of content of different predefined types including particular content and layout specifications associated with each type of instruction block. The content and layout instructions of instruction blocks may be rendered by execution engine 210 to device-specific instructions to generate animations, images, text, and interactive planograms by mobile device 180 and digital signage 192 that direct one or more employees to perform actions needed to complete a task.

Database 114 stores one or more tasks as tasks data 226. As described in more detail herein, tasks comprise planograms and/or instruction sets that comprise information and actions to direct an employee of one or more retail stores 124a-124n to, for example, alter the arrangement of products on the shelves in a particular section of a particular store. By way of example only and not of limitation, tasks may include, for example, altering the arrangement of products in the juice or soup section of a grocery store, or the toy section of a big-box retailer.

Collected data 228 comprises data collected in association with execution of a task, including, for example, completion time of a task and/or of an action during execution of the task, the number and types of issues that arose during execution, which actions issues arose at during execution, one or more retail stores 124a-124n where task was executed, sales performance of products executed during the task, compliance with the planogram, the identification of persons involved in creating, communicating, and executing the tasks, and the like.

Historical data 230 comprises, for example, any data relating to past sales, past demand, purchase data, promotions, events, or the like of one or more retailers 120. Historical data 230 may be stored at time intervals such as, for example, by the minute, hour, daily, weekly, monthly, quarterly, yearly, or any suitable time interval, including substantially in real time.

Product data 232 comprises identifier, item identifiers, pricing data, attribute data (including, for example, brands, dimensions, product images, three-dimensional product representations, and the like), inventory levels, and other like data about one or more, hierarchy, substitutable products, target service levels, and the like. Mobile device 180 may retrieve product data 232 in connection with displaying one or more actions of a task. For example, as described in more detail below, an action of a task may instruct an employee to locate a product to remove or place on shelving system 190. Mobile device 180 may retrieve product attributes, product images, and other product description information from product data 232 to help the employee identify the product.

Retail store data 234 comprises data describing physical attributes of one or more retail stores 124a-124n, including, for example, the types of shelving and retail displays used, store layout, specialty products specific to that region, and the like.

Figure 3:
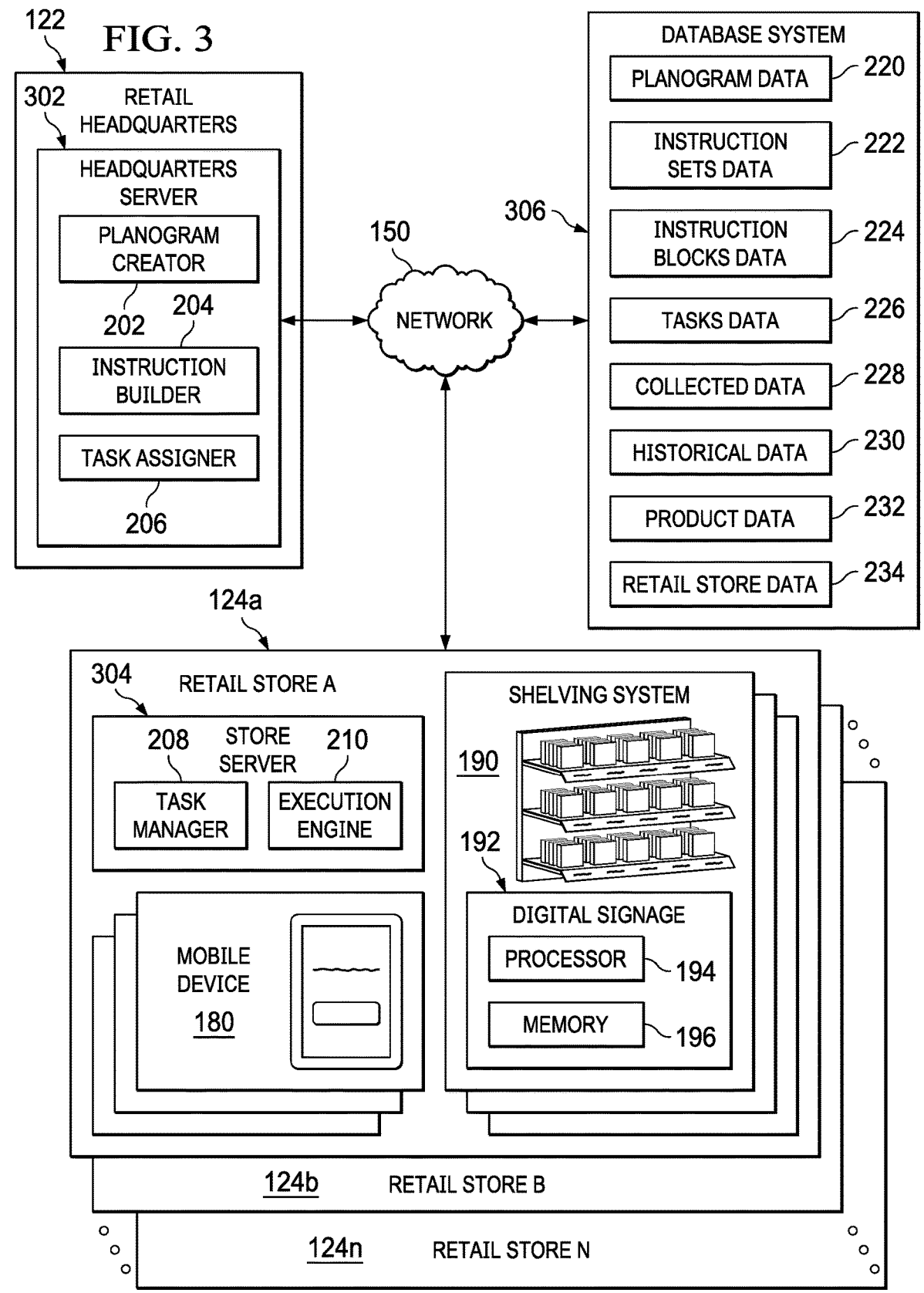
FIG. 3 illustrates an exemplary planogram planner, according to a further embodiment.

FIG. 3 illustrates augmented planogram system 100 of FIG. 1, according to a further embodiment. As discussed above, retailer 120 may comprise retail headquarters 122 and one or more retail stores 124a-124n. According to one embodiment, retail headquarters 122 comprises headquarters server 312 having planogram creator 202, instruction builder 204, and task assigner 206 of planogram planner 110. According to another embodiment, one or more retail stores 124a-124n comprise store server 314 having task manager 208 and execution engine 210 of planogram planner 110. Although headquarters server 312 is shown and described as comprising planogram creator 202, instruction builder 204, and task assigner 206 and store server 314 is shown and described as comprising task manager 208 and execution engine 210, embodiments contemplate any one or more modules of planogram planner 110 located at one or more servers local to, or remote from, retail headquarters 122 and one or more retail stores 124a-124n, according to particular needs. In addition, database system 302 may comprise a remote data storage location providing headquarters server 312 and store server 314 storage, modification, access, and/or retrieval of planogram data 220, instruction sets data 222, instruction blocks data 224, tasks data 226, collected data 228, historical data 230, product data 232, and retail store data 234. By way of explanation and not of limitation, planogram planning and execution is described in connection with augmented planogram system 100. In the following explanation, although particular actions of planogram creation, instruction creation, task assignment, task management, and planogram execution, are described as occurring at headquarters 122 and/or one or more retail stores 124a-124n, embodiments contemplate performing one or more actions by planogram planner 110, headquarters 122, one or more retail stores 124a-124n, computers 140, mobile device 180, shelving systems 190, and/or digital signage 192, according to particular needs.

Figure 4:
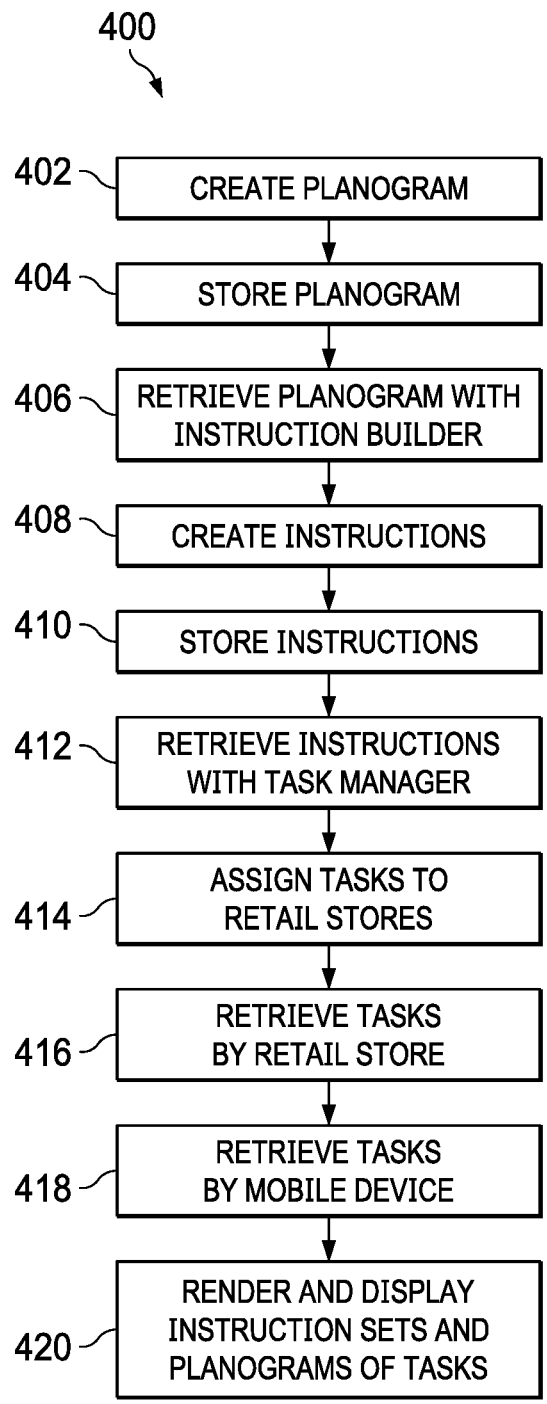
FIG. 4 illustrates an exemplary method of planogram planning, according to an embodiment.

FIG. 4 illustrates an exemplary method 400 of planogram planning and execution, according to an embodiment. The following method 400 proceeds by one or more activities, which although described in a particular order may be performed in one or more permutations, combinations, orders, or repetitions, according to particular needs.

Method 400 begins at activity 402 where planogram creator 202 at retail headquarters 122 creates a planogram based on, for example, product information, business requirements, historical data, sales objectives, promotions, and other like information. According to embodiments, planogram comprises spatial coordinates and is presented in a standardized format that may include information such as the dimension, number, and location of shelving systems 190 and the identification information, dimension, attributes, and location of one or more products. The information may comprise text such as, "Shelf 1 is [length dimension] and is at [location] in the planogram," and "[Product N] is [size]."

At action 404, planogram creator 202 at retail headquarters 122 stores planogram in planogram data 220. As described above, planogram comprises a plan of the arrangement of shelves and products in a section of targeted stores. Planogram may be sent to one or more retail stores 124a-124n as images, PDFs, or other static formats. According to some embodiments, planograms comprise a flexible format, such as, for example, planogram may be communicated to a store through JSON or a markup language. For example:

<planogram>
  <shelve>
    <product/>
    ...
  </shelve>
  ...
</planogram>

In this way, a planogram is viewable as a graphical representation on mobile device 180 and digital signage 192, and the planogram may better address informational needs at each part of the process. Planogram data 220 may be located at one or more locations remote or local to headquarters 122 or one or more retail stores 124a-124n of retailer 120, and provide access to one or more planners, managers, or employees to modify or consult planograms, according to particular needs.

At action 406, instruction builder 204 at retail headquarters 122 retrieves the planogram from planogram data 220 and creates an instruction set from instruction blocks. Instruction builder 204 may then package instruction set with the planogram. As described in more detail below, instruction builder 204 generates an instruction set that is interpreted by planogram execution engine 210 along with the packaged planogram during task execution to display on mobile device 180 and digital signage 192 various instructions, actions, graphics, including interactive planogram, associated with completing a task.

Instruction builder 204 generates instruction sets from one or more configurable instruction blocks that comprise predefined content placeholders having predefined layouts and content types. For example, a question instruction block comprises a predefined content placeholder to insert a question into an instruction set. After inserting a question and selecting any configurable options, question instruction block may be inserted into instruction sets. When the instruction set comprising the question instruction block is received by execution engine 210, execution engine 210 renders graphics, text, animations, and the like to display the question in a format specific for the device executing the instruction set. Instruction blocks may be linked linearly or in branched combinations to build an instruction set for a task. For example, when linked linearly, instruction blocks may correspond to the various sections and actions needed in order to complete a planogram execution task. Furthermore, the flow of instruction blocks could be more complex than a simple linear process. The outcome of an instruction block, like a question, may trigger a different branch of a more complex flow of instructions.

At action 408, instruction builder 204 of retail headquarters 122 creates instruction sets to include with a planogram. As described in greater detail below, instruction sets comprise attaching additional information to a planogram in order to clarify what needs to be done at the store level. The amount of instruction varies based on particular needs. According to some embodiments, instruction sets are composed in word processing software and dispatched to a store in PDF format. Because instruction sets are designed to address all different kind of store configurations, instruction sets usually contain much more information than a particular store needs. Instruction sets may include, for example, special care that is needed with planogram setup or product handling, including text, such as, "Make sure you wear gloves," or "Make sure you have checked if you have all of the items. As described in more detail below, some embodiments of instruction builder 204 displays an interface that directs questions from headquarters 122 to one or more retail stores 124a-124n so that planogram planner 110 may tailor planograms and instruction sets to particular configurations of shelves and product offerings of the various particular one or more stores 124a-124n. For example, retail headquarters 122 may only know general information such as the type of shelving systems supported by retailer 120, but may lack specific information for each one or more stores 124a-124n. This results in retail headquarters 122 sending out general shelving instructions to all one or more stores 124a-124n, which requires the category managers of such one or more stores 124a-124n to figure out how to identify and deal with issues that arise during planogram execution. According to some embodiments, instruction builder 204 provides an interface for retail headquarters 122 to send questions to one or more stores 124a-124n such as, "What type of shelving system do you use in the store?" In response to the received answers to the questions, instruction sets from retail headquarters 122 will be tailored towards the particular selection. According to embodiments, a selection as discussed throughout this disclosure, may be performed by, for example, user selection of an appropriate area of a touchscreen interface or any digital interface, or automatically by, for example, detection or mapping through an imaging device, or upon communication from a connected communication or networked device. As part of the instruction creation process, retail headquarters 122 may also, for example, collect useful data about specific questions asked (e.g. what type of shelving system is used) and other questions concerning that particular one or more stores 124a-124n. The answers can be sent back to retail headquarters 122 to fill in information that they might not have currently.

At action 410, instruction builder 204 of retail headquarters 122 stores an instruction set in instruction set data 222. As discussed above, instruction set data 222 may be located at one or more locations remote or local to retail headquarters 122 or one or more stores 124a-124n of retailer 120 and provide access to one or more users to modify or consult instruction sets. According to embodiments, instruction builder 204 comprises a modular construction process that replaces the unnecessary documentation sent between headquarters and the store. According to another embodiment, instruction builder 204 constructs each of the screens of a task with limited information so an instruction set is more segmented and each instruction focuses on a limited number of actions. Additionally, each instruction block provides for creating an interactive planogram that links different portions of a planogram with various instruction blocks. This may comprise, for example, linking a planogram to product information, current inventory, images of the product, or other like interactive features.

According to another embodiment, an output of instruction builder 204 comprises each of the instruction blocks packaged with their layouts and their corresponding links between the blocks, as described in more detail below. Mobile device 180 of one or more retail stores 124a-124n may then receive the output as task with each instruction displayed according to the configuration, sequence, and layout information encoded by instruction blocks and the connectors between them.

In a further embodiment, instruction builder 204 supports multiple devices for task execution. For example, an employee in one or more retail stores 124a-124n may use mobile device 180 comprising a smartphone or tablet computer while moving through the store to execute a task. However, a user in retail headquarters 122 may construct an instruction set using instruction builder 204 on computer 160. Because there are multiple form factors, including small screens, large screens, wide screens, digital signage 192, or various interfaces, such as touchscreen, mouse, keyboard, or the like, instruction builder 204 detects the device on which it is being executed and automatically alters the display size and interface options based on the detected device.

At action 412, task assigner 206 retrieves instruction sets from instruction sets data 222 and couples instruction sets with one or more tasks. For example, tasks may comprise a planogram and an instruction set for a particular one or more stores 124a-124n or section of one or more stores 124a-124n and may be dispatched to mobile device 180 associated with the assigned one or more one or more stores 124a-124n. According to embodiments, tasks may comprise, for example, altering the placement of products on the shelves in a particular section of a particular one or more stores 124a-124n, such as, for example, reordering the juice or soup section of a grocery store, or reordering the toy section of a big-box retailer.

At action 414, task assigner 206 of retail headquarters 122 may assign tasks to one or more retail stores 124a-124n. A particular one or more stores 124a-124n may have many tasks at one time, and each task may have an assigned due date or priority. As discussed above, task data 226 may be located at one or more locations remote or local to retail headquarters 122 or one or more stores 124a-124n of retailer 120 and provide access to one or more users to modify or consult tasks.

At action 416, task manager 208 of one or more retail stores 124a-124n retrieves tasks from task data 226. According to embodiments, task manager 208 communicates to a retail one or more stores 124a-124n instruction sets and a list of tasks, that may be prioritized based, at least in part, on, for example, a due date and recipient identification information. Task manager 208 of one or more retail stores 124a-124n may retrieve tasks from task data 226 and combine tasks with instruction sets from instruction sets data 222. According to embodiments, task manager 208 communicates a list of tasks and instructions to mobile devices 180 associated with an employee at one or more stores 124a-124n.

At action 418, mobile device 180 associated with a store employee of one or more retail stores 124a-124n receives a prioritized list of tasks. Mobile device 180 receives a list of instruction sets and tasks that may be prioritized based, at least in part, on the information communicated to the employee. Execution engine 210 of one or more retail stores 124a-124n receives planograms and instruction sets (which may include a due date and recipient identification information) and renders planograms and instructions sets for display on computer 160, one or more mobile devices 180, and/or digital signage 192.

At action 420, execution engine 210 renders and displays the planogram and the instruction set on mobile device 180 and digital signage 192 of shelving system 190. According to embodiments, execution engine 210 renders and displays the planogram and the instruction set on mobile device 180 and digital signage 192 directly from a database or server. According to other embodiments, planograms and instructions sets may be rendered for display on digital signage 192, while mobile device 180 provides a store employee with an interactive interface of augmented planogram system 100 to gather more information, if needed, answering questions from the retail headquarters, and executing the planogram and instruction set associated with a selected task. When the store employee is ready to execute a selected task, the employee may open the task on mobile device 180. Each of the actions associated with instruction set will appear in a sequence on mobile device 180 determined by the selected instruction blocks by instruction builder 204. In addition, each of the actions also may appear on digital signage 192 of shelving systems 190.

According to embodiments, instruction blocks may comprise, for example, one or more note instruction block corresponding to an instruction block for adding a note, question instruction block corresponding to an instruction block for generating and displaying a query (and transmitting the response), floorplan instruction block corresponding to an instruction block for displaying floorplans, planogram instruction block corresponding to an instruction block for displaying planograms (including interactive planograms), survey instruction block corresponding to an instruction block for generating and displaying surveys (and transmitting the results), video instruction block corresponding to an instruction block for embedding and playing videos, inventory instruction block corresponding to an instruction block for querying an inventory and displaying an inventory level, location instruction block corresponding to an instruction block displaying a location, camera instruction block corresponding to an instruction block for image capture (such as by, for example, imaging sensor 186 of mobile device 180) and image instruction block corresponding to an instruction block for embedding and displaying an image.

According to some embodiments, instruction blocks comprise templates that support different types of content and may be used to efficiently build an instruction set. In one embodiment, an instruction block comprises a list of expected content that may be added during planogram creation and a set of visual templates that determines how a layout of information during execution is displayed on, for example, mobile device 180 and digital signage 192. In addition, or as an alternative, instruction blocks may include algorithms and/or links to other systems that processes or supplements the content provided manually. As an example only and not by way of limitation, upon creation of an inventory instruction block (comprising, for example, an inventory check feature), instruction builder 204 may require an input of a SKU to be associated with the inventory instruction block. When the instruction set comprising the inventory instruction block is executed, execution engine 210 may use the previously inputted SKU entered during inventory instruction block creation and evaluate the context of its use to automatically determine an identification of a store. According to embodiments, execution engine 210 may additionally query an inventory system and use the resulting response as an output to automatically populate the element associated with the inventory instruction block displayed during execution of an instruction set comprising the inventory instruction block.

In addition, embodiments contemplate during execution of one or more tasks, execution engine 210 may collect data on task execution, which may be communicated to retail headquarters 122 for improvement of planograms and instruction sets. Although one r more actions associated with planogram creation, instruction set building, task assignment, task management, and planogram execution are described as occurring at retail headquarters 122 or one or more retail stores 124a-124n, actions may be performed by and at any location local to or remote from retailers 120.

Figure 5:
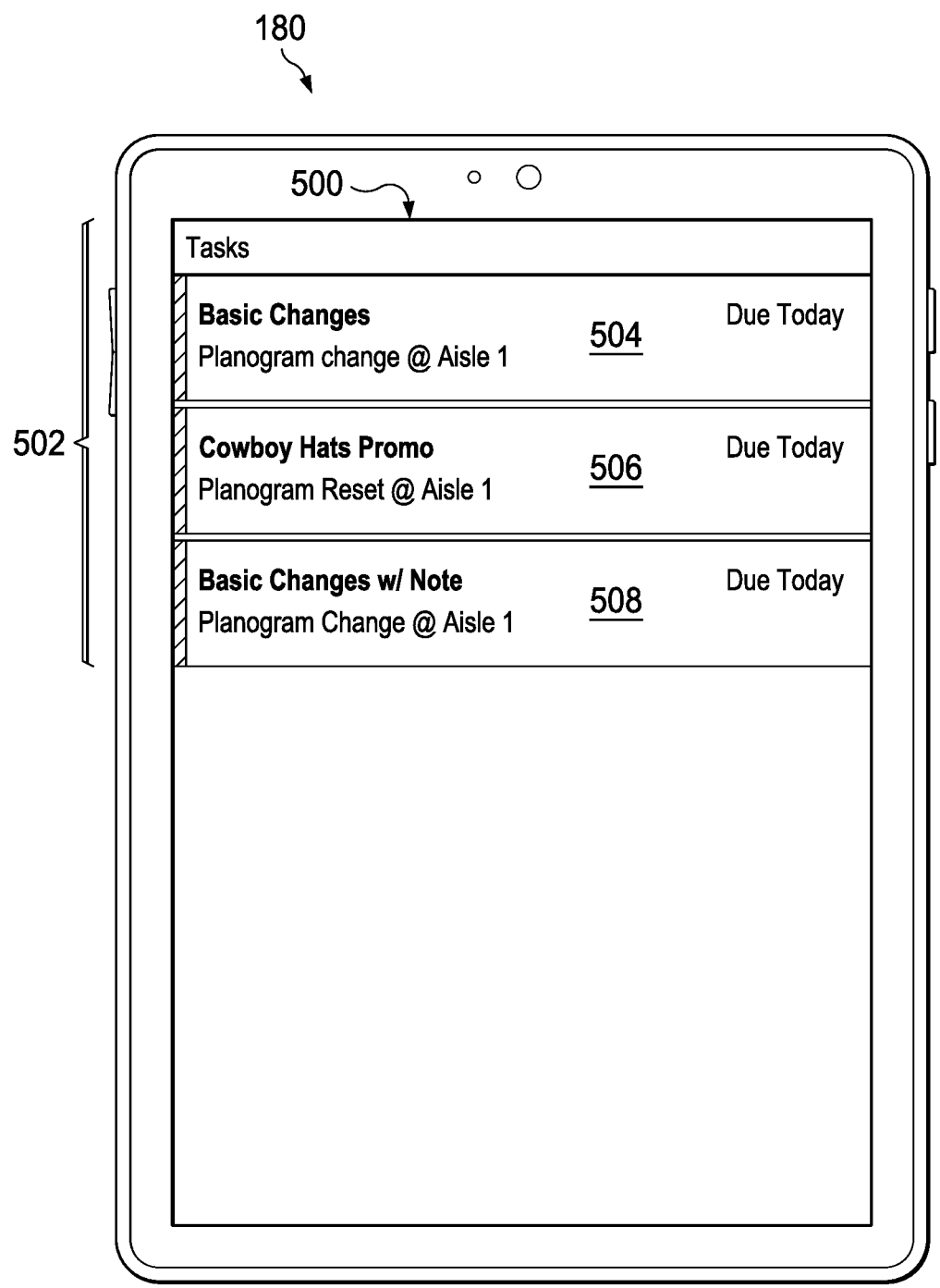
FIG. 5 illustrates an exemplary task manager interface, according to an embodiment.

In order to further explain method 300 of planning and execution of interactive augmented planograms, an example is now given. In the following example, FIG. 5 illustrates an exemplary task manager interface 500, according to an embodiment. In one embodiment, task manager interface 500 comprises task list 502. Task list 502 comprises a prioritized listing of one or more tasks received from tasks data 226 that are sent to mobile device 180 and digital signage 192 of shelving systems 190, to be executed in a particular store. Task list 502 may display one or more tasks in an order of priority or in order of a due date to help schedule execution of the one or more tasks. In another embodiment, task manager interface 500 displays additional information illustrating a level of effort, complexity and priority of the task, which may help scheduling an appropriate time to attempt the task.

Task manager interface 500 may display a name and a task description on task list 502 in connection with each task. For example, the task description of "Basic Changes" task 504 indicates it directs an employee to perform a shelving change of products on Aisle 1 based on a planogram change. In one embodiment, a planogram change comprises changes of variable importance made to a current layout. That is, it may be a modified version of an old planogram that requires a remove, add, or adjust for some of the products. For example, the planogram change may simply consist of adding a new flavor of cookies immediately next to the regular version of the same cookies or it may request to remove a product that has been recalled and adjust the facing of another product to fill the gap of the recalled product.

By way of a further example, task list 502 also comprises Cowboy Hats Promotion task 506. The task description of Cowboy Hats Promotion task 506 indicates it directs an employee to perform a shelving change of products on Aisle 1 based on a planogram reset. A planogram reset may comprise a reset in the layout of the products. For example, the execution employee may need to remove all of the products and redo the product arrangement based on newly communicated layout. Task list 502 also comprises a Basic Changes with Note task 508. Basic changes with Note task 508 directs an employee to perform a shelving change of products on Aisle 1 based on a planogram change, as indicated by the description. In response to an employee selecting a task from task list 502, task manager interface 500 may display additional detailed task information.

Figure 6:
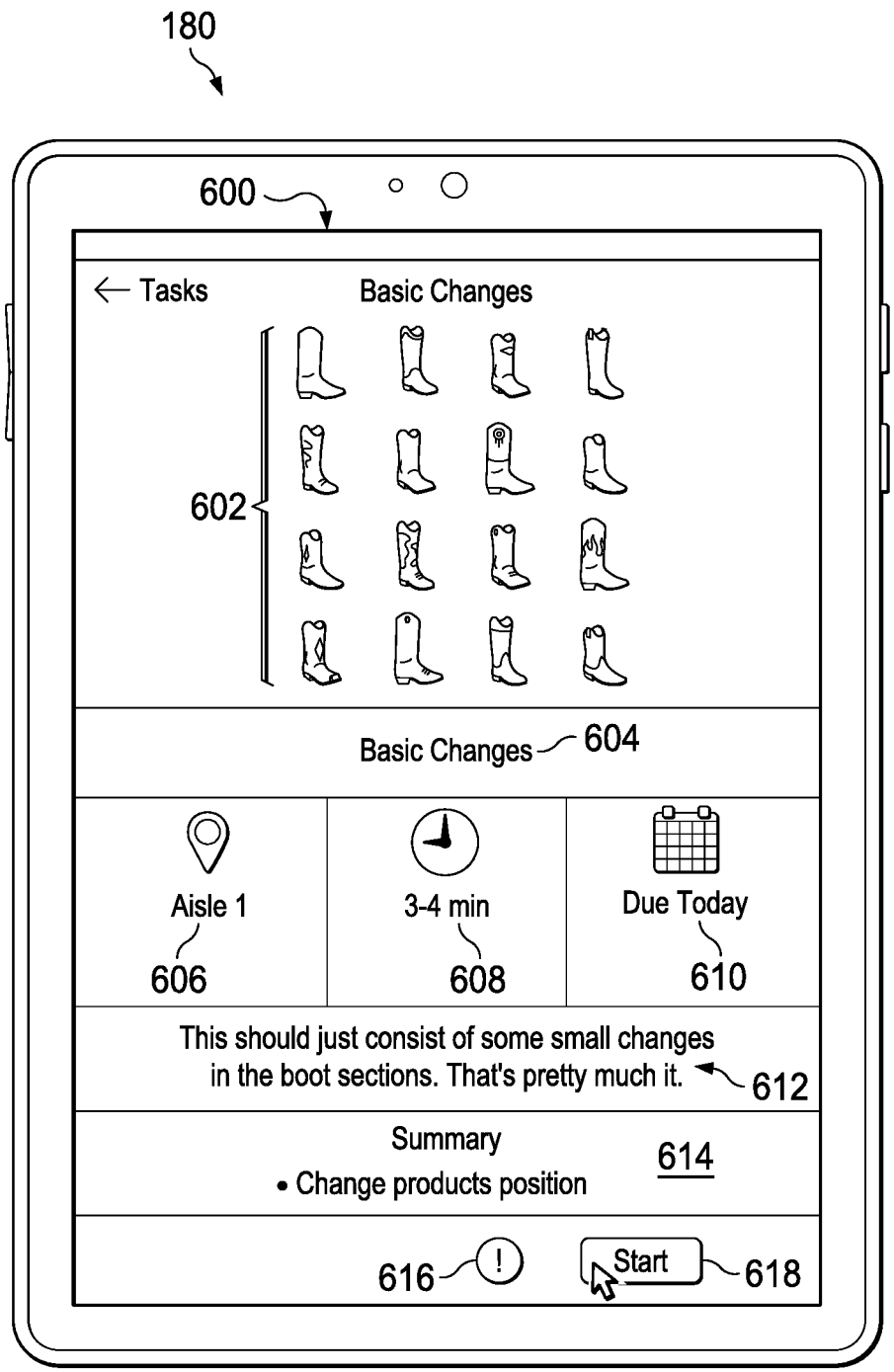
FIG. 6 illustrates an exemplary task overview, according to an embodiment.

FIG. 6 illustrates an exemplary task overview 600, according to an embodiment. According to embodiments, after a basic changes task 504 is selected from task list 502, task manager interface 500 may display task overview 600 of the basic changes task 504 to begin task execution. As described below, task execution is segmented in one or more actions to provide focused instructions for each of one or more actions to complete a task. Segmenting task execution also provides for collecting data during each of one or more actions of execution, providing insight on which actions, instructions, tasks, and the like are more time consuming than others and giving further information on planograms, instruction sets, employees, stores, products, and the like to try to optimize or clarify future tasks.

According to an embodiment, task overview 600 presents information about a selected task on mobile device 180. According to embodiments, task overview 600 may display task planogram 602 (here, representing a cowboy boots display), task name 604, task location 606 (such, for example, as the Aisle or section of the store), task completion time 608, task due date 610, task description 612, and task summary 614. According to embodiments, task overview 600 comprises a task issue button 616 that, in response to selection by an employee, initiates a process for flagging an issue with the task. According to an embodiment, planogram planner 110 may receive a flag indicating the particular products, instructions, actions, shelf locations, or the like which caused issues when executing planograms, instruction sets, and/or tasks. Planogram planner 110 may then modify planograms, instruction sets, and/or tasks based on issue reporting on a planogram by eliminating or modifying any products, instructions, actions, shelf locations, or the like which caused issues when executing planograms, instruction sets, and/or tasks.

Task overview 600 may comprise start button 618 that, in response to selection by an employee, presents planograms and instruction sets for completing a selected task on mobile device 180 and digital signage 192.

As described herein, execution engine 210 may render actions of instruction set in a format specific to the display on which it is rendered. On mobile device 180, for example, execution engine 210 may render an action of instruction set as a text description of the action along with an illustrative diagram or planogram. On digital signage 192 of shelving systems 190, execution engine 210 may render an action of instruction set as animations, images, or text that are contextual to the location in the store associated with the action of the instruction set. By way of further explanation, an example is now given in association with a location action of an exemplary instruction set.

Figure 7:
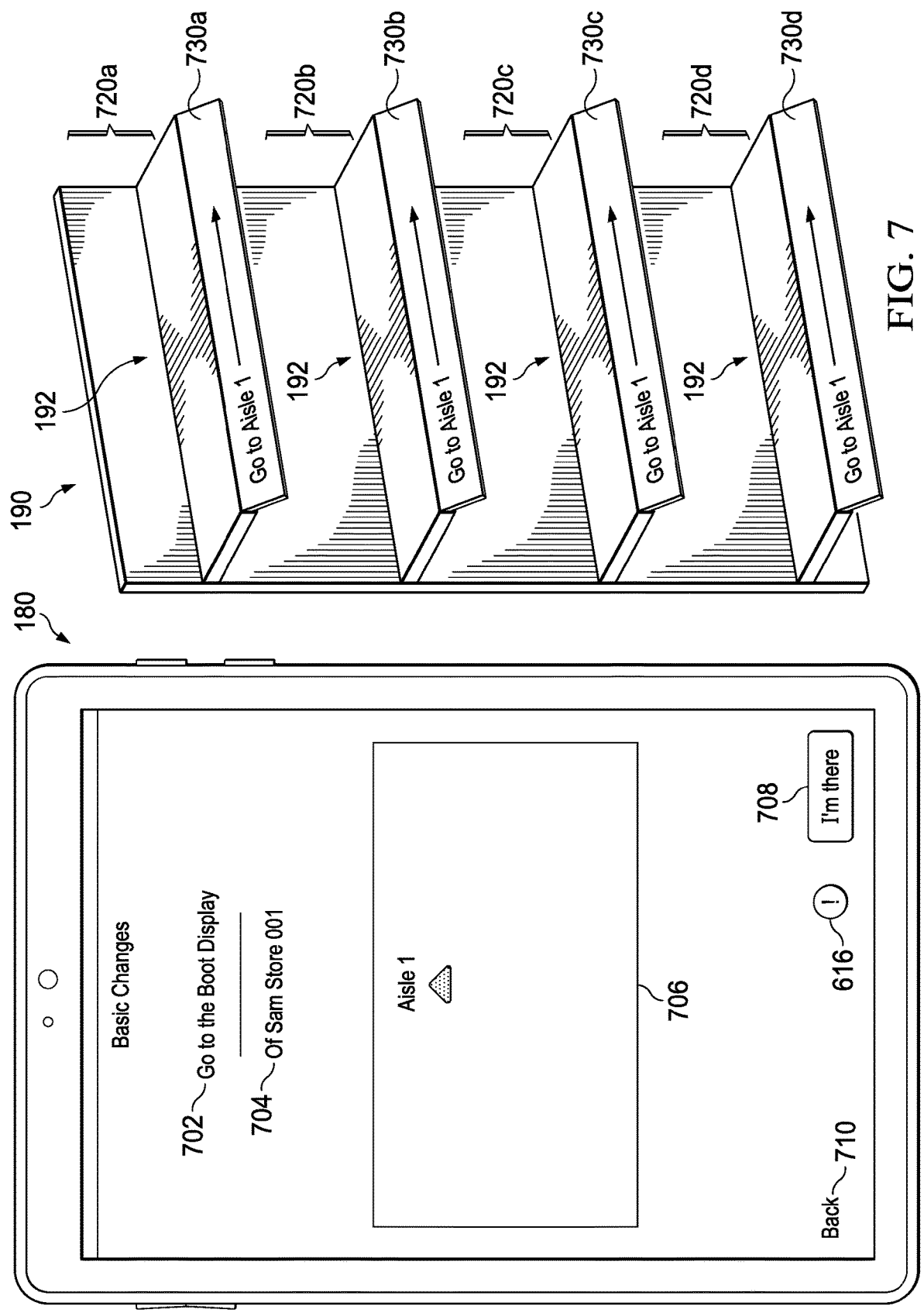
FIGS. 7-13 illustrate execution of the basic changes task of FIG. 5, according to an embodiment.

FIG. 7 illustrates an exemplary location instruction of a basic changes task 504 on mobile device 180 and digital signage 192, according to an embodiment. According to an embodiment, once basic changes task 504 is initiated by task manager 208, execution engine 210 renders instructions from instruction set for actions needed to complete the task for display on mobile device 180 and digital signage 192 of shelving systems 190. A first instruction of the instruction set may comprise a location instruction generated from a location instruction block. Execution engine 210 renders location instruction for the basic changes task 502 on mobile device 180 as text instruction 702. Text instruction 702 instructs an employee to, "Go to the Boot Display." Execution engine 210 renders location information associated with the first action of instruction set as a store identifier 704, which, in this example, indicates that this particular task is intended for the Ol' Sam Store 001. Furthermore, execution engine 210 also displays diagram 706, which indicates that the Boot Display identified in the first action of instruction set is in the middle of Aisle 1 (as indicated by an arrow pointing toward Aisle 1). Although a particular text instruction 702, store identifier 704, and diagram 706 are given, embodiments contemplate any suitable textual instruction, store identifier, or diagram, according to particular embodiments. According to embodiments, mobile device 180 may identify an employee's location to synchronize with the rendering on digital signage 192 of shelving systems 190 and may prevent or allow the employee to advance to the next action of the instruction set based on the employee being in a location associated with the location specified in the instruction set. Additionally, or in the alternative, in response to a user selection of advancement button 708 (labeled "I'm there" in the described example), execution engine 210 proceeds to a further action in an instruction set and displays instructions for the next action of the instruction set on mobile device 180 and digital signage 192. Furthermore, according to embodiments, in response to a user selection of back button 710, execution engine 210 may return to a previous action in an instruction set and update display of mobile device 180 and digital signage 192 to display instructions associated with a previous action in the instruction set.

For digital signage 192, execution engine 210 may render location instruction block as directional information to guide the execution employee through one or more retail stores 124a-124n to the particular location of the task. Shelving system 190 may comprise four shelves 720a-720d. Digital signage 192 may comprise four digital displays 730a-730d coupled to the front of each of the four shelves 720a-720d. Digital displays 730a-730d may display animations, images, and/or text based, at least in part, on the location of the shelving system 190 within the one or more retail stores 124a-1224n, the location of the employee within the one or more retail stores 124a-124n, the current or planned products located at particular positions on shelving system 190, a current instruction of the instruction set, or one or more additional considerations, as described herein. According to the illustrated embodiment, the location instruction of the instruction set is rendered as directions on digital signage 192 comprising arrows and instructions to "Go to Aisle 1." To render these instructions, the execution engine 210 must determine the current location of the employee and the relative positioning of the shelving system 190 in relation to the location Aisle 1. According to embodiments, execution engine 210 retrieves the employee location from a GPS or other location sensor on mobile device 180 and the relative positioning of the shelving system 190 within the one or more retail stores 124a-124n from retail store data 234.

According to embodiments, after the employee indicates by selection of button 708 (or mobile device 180 automatically determines) the employee is in the location specified in the location instruction block, the execution engine continues to a subsequent instruction in the instruction set determined by the sequential instruction block.

Figure 8:
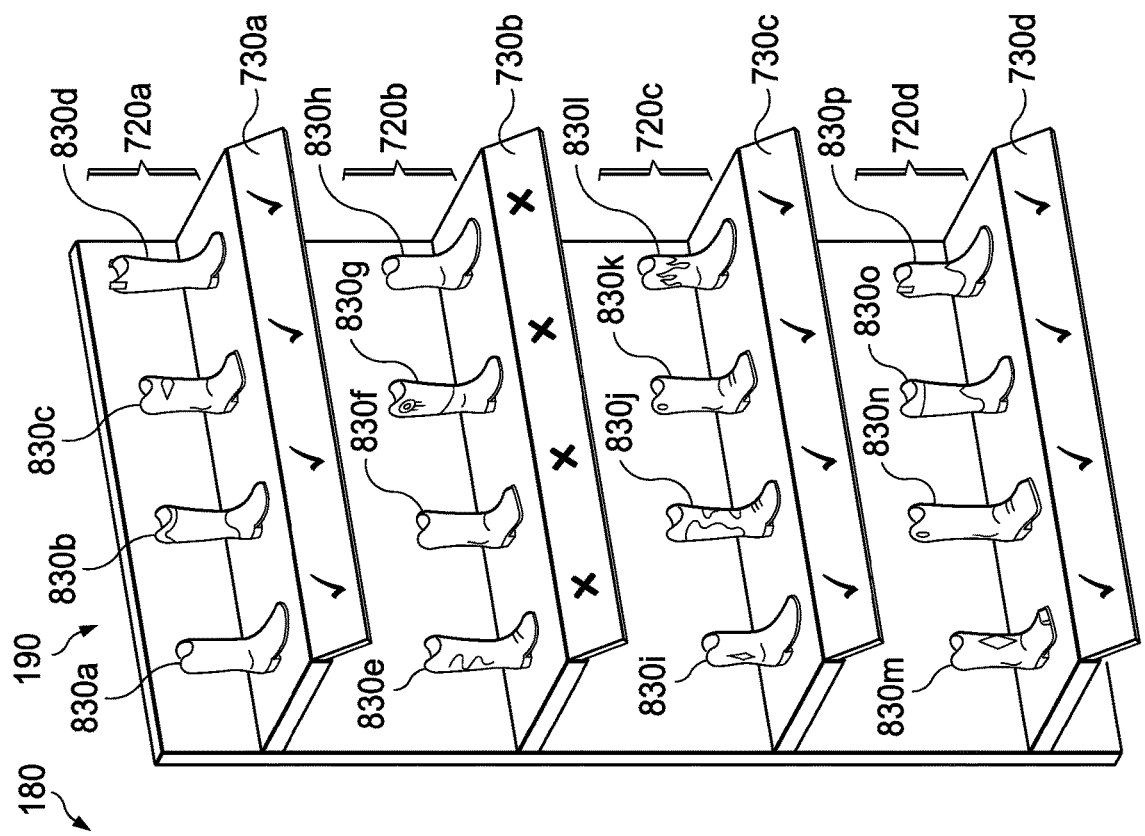
Figure 8:
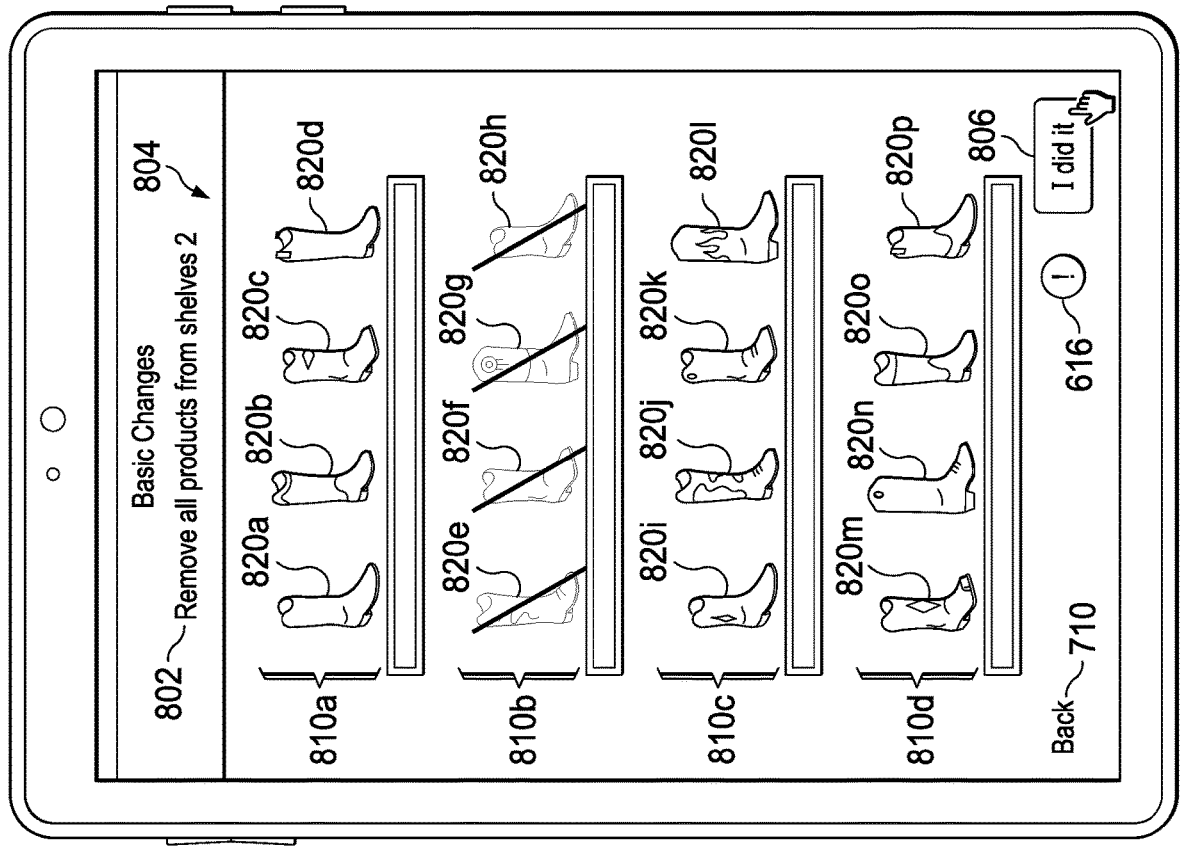

FIG. 8 illustrates an interactive planogram on mobile device 180 and digital signage 192, according to an embodiment. Mobile device 180 and digital signage 192 may generate an interactive planogram by displaying animations, images, and text indicating product placement, product movement, product removal, and product addition to shelving systems 190 and representing the current product layout and actual shelving system 190 that is present at the one or more retail stores 124a-124n where employee is executing the task. As described above, execution engine 210 may receive instruction sets and planograms associated with tasks and render device-specific instructions to display animations, images, and text.

Continuing with the exemplary basic changes task 504, execution engine 210 renders an instruction of basic changes task 504 on mobile device 180 as textual instructions 802 that directs the employee to remove all products from a second shelf and as interactive planogram 804 comprising photographs or icons that visually represents the current product layout of shelving system 190. As described above, shelving system 190 comprises four shelves 720a-720d, and each of the four shelves 720a-720d is coupled with digital displays 730a-730d of digital signage 192. Interactive planogram 804 comprises first row 810a that corresponds to first shelf 720a and is illustrated with product images 820a-820d that represent products 830a-830d. Second shelf 720b is represented by second row 810b and is illustrated with product images 820e-820h the represent products 830e-830h. Third row 810c represents third shelf 720c, and product images 820i-820l represent products 830i-830l. Fourth row 810d represents fourth shelf 720d, and product images 820m-820p represent products 830m-830p. Although interactive planogram 804 and shelving system 190 are shown and described as comprising four rows 810a-810d representing four shelves 720a-720d and having sixteen product images 820a-820p representing sixteen products 830a-830p, embodiments contemplate interactive planogram 804 having any number of rows and product images to represent any number of shelves and products of shelving system 190, according to particular needs.

Returning to the current exemplary basic changes task 504, mobile device 180 displays textual instructions 802 that directs the employee to remove products 830e-830h from second shelf 720b. Interactive planogram 804 illustrates the removal of products 830e-830h with slashes placed across product images 820e-820h representing products 830e-830h. Digital signage 192 also illustrates the removal of products 830e-830h by displaying X's below on second shelf digital display 730b beneath each of products 830e-830h that are to be removed according to the rendered instruction. In addition, first shelf digital display 730a, third shelf digital display 730c, and fourth shelf digital display 730d displays checkmark icons below products 830a-830d and 830i-830p that are not being moved in connection with this this instruction.

In response to an indication that all products are removed from the second shelf, such as an employee selecting completion button 806 to indicate completion of the action, the execution process continues to a further action associated with a subsequent instruction block in instruction set.

According to embodiments, interactive planogram 804 is personalized based, at least in part, on an employees' experience, the context of one or more retail stores 124a-124n wherein the task is executed, and the like. Instead of displaying unnecessary information, interactive planogram 804 comprises an interactive dialogue, which may be presented as one or more actions of instruction set, which alters the displayed planogram based on retail store data 234, employee preferences, and the like. Although interactive planogram 804 is shown and described as associated with execution engine 210, embodiments contemplate displaying inventories, floor plans, a non-interactive planogram, and the like.

Figure 9:
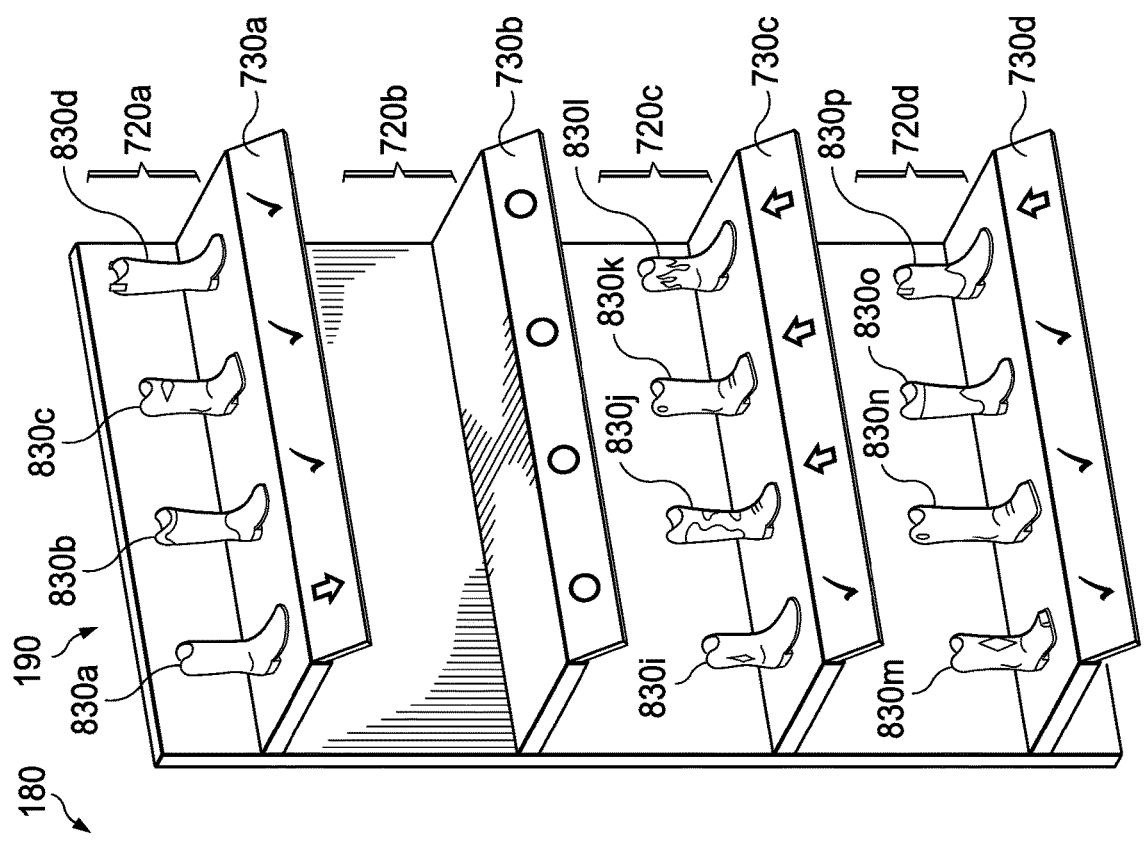
Figure 9:
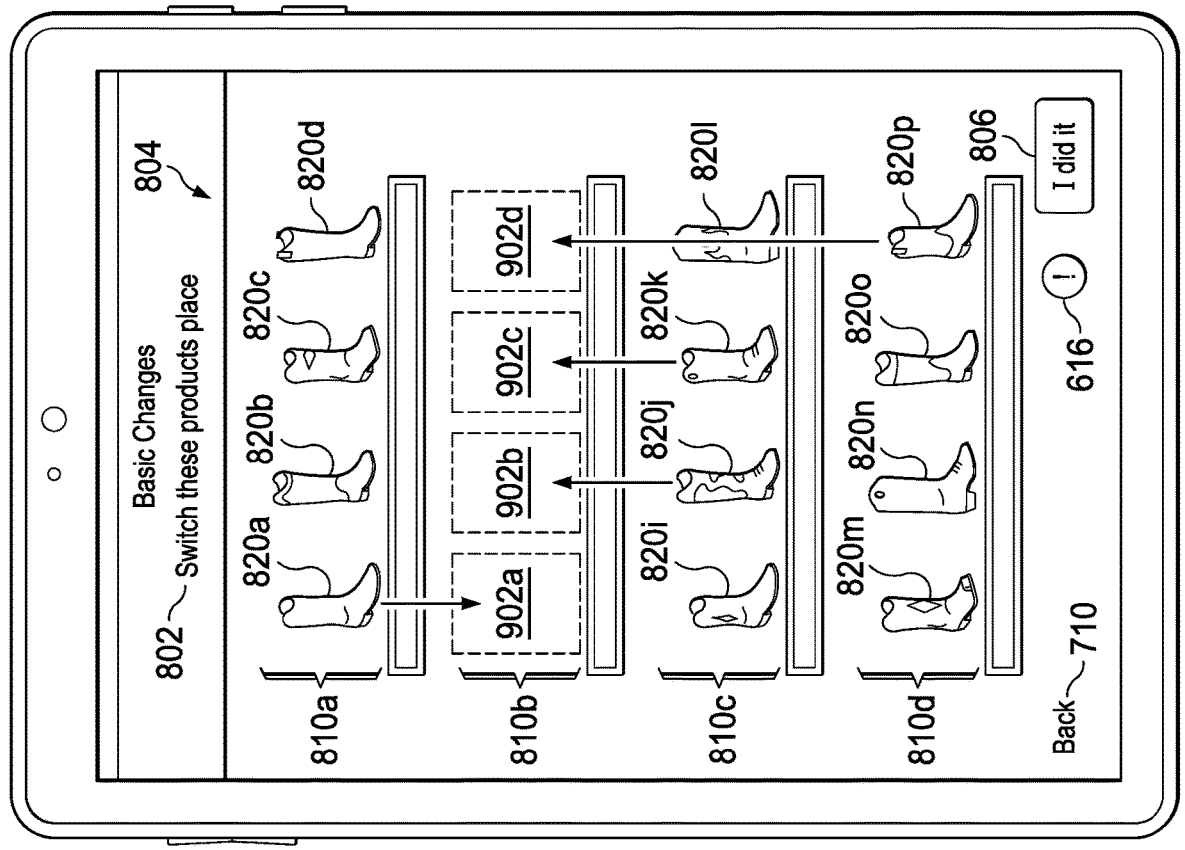

FIG. 9 illustrates interactive planogram 804 on mobile device 180 and digital signage 192, according to an embodiment. Continuing with exemplary basic changes task 504, interactive planogram 804 represents a further action determined by the subsequent instruction of instruction set. Interactive planogram 804 is displayed on mobile device 180 in connection with textual instruction 802 that directs the employee to switch the places of four products. Interactive planogram 804 illustrates the movement of products 830c, 830j-830k, and 830p with arrows pointing from products 830c, 830j-830k, and 830p to empty boxes 902a-902d corresponding to empty spaces on second shelf 830b where products 830e-830h were removed according to the previous instruction.

Digital signage 192 may display animations, graphics, and text synchronized with the current instruction rendered by mobile device 180. For example, digital displays 730a-730d may display arrows and checkmarks beneath products 830a-830d and 830i-830p indicating whether to move a product or leave it in the current placement. In addition, digital displays 730a-730d may display circles indicating placements on shelves 720a-720d where a product should be placed and corresponding to empty boxes 902a-902d of interactive planogram 804. Although digital displays 730a-730d are described as displaying particular animations, images, or text in connection with particular actions of a rendered instruction, embodiments contemplate displaying any suitable animations, images, or text in connection with the described action or one or more additional actions, according to particular needs.

In response to an indication that all products are switched, such as an employee selecting button 806 indicating completion of the action, the execution process continues to a further action.

Figure 10:
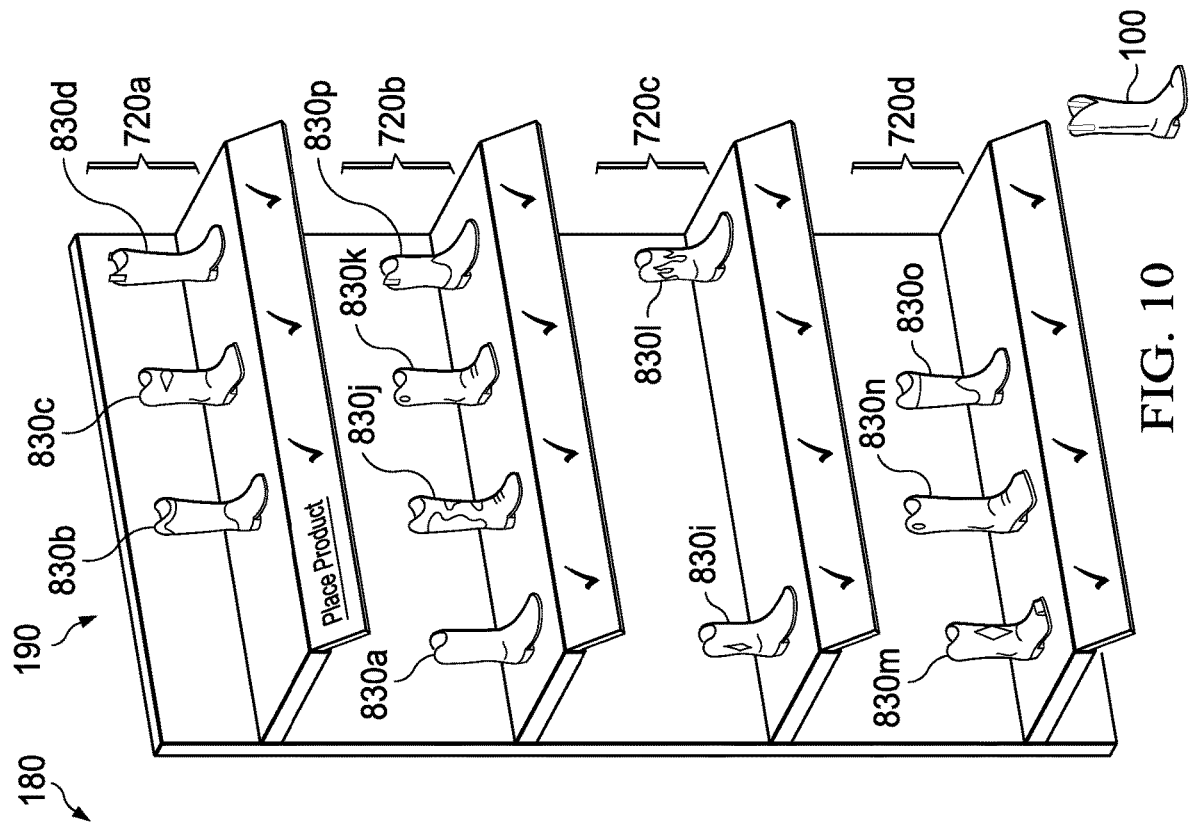
Figure 10:
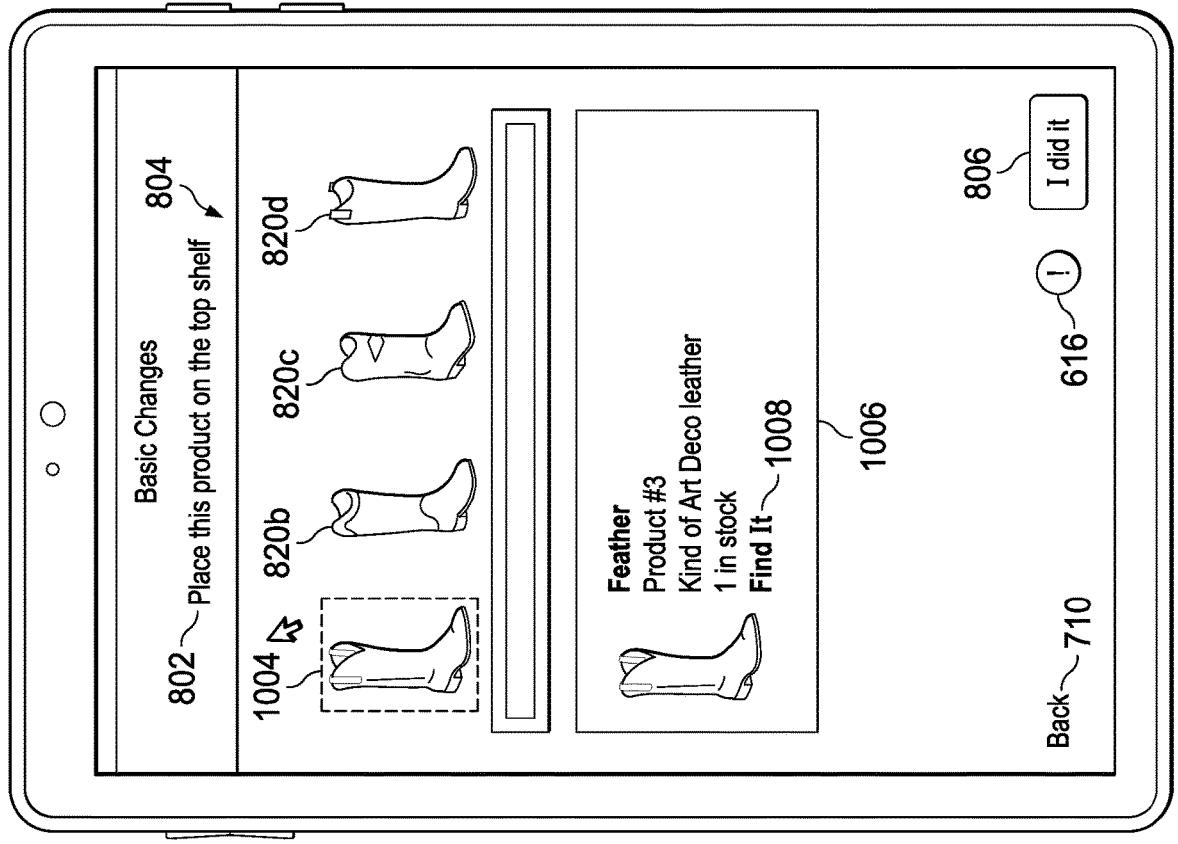

FIG. 10 illustrates an interactive planogram on mobile device 180 and digital signage 192, according to an embodiment. Continuing with exemplary basic changes task 504, interactive planogram 804 represents a further rendered instruction of the instruction set associated with basic changes task 504. Interactive planogram 804 is associated with textual instruction 802 that directs the employee to place an indicated product on top shelf, which corresponds to first shelf 720a of shelving system 190. Interactive planogram 804 also illustrates product 1002 with product image 1004 and product description 1006. Product description 1006 indicates product 1002 comprises a "feather" cowboy boot, the number of units in stock, and a selectable "Find it" button 1008. Selection of find it button 1008 may display further information to locate or identify product 1002. In one embodiment, the employee may interact with mobile device 180 to display product information on all products in interactive planogram 804 or connect retrieve inventory data from an inventory system to locate a product, determine if a product is in stock at one or more retail stores 124a-124n, or an arrival time of a shipment of the product to one or more retail stores 124a-124n. Digital signage 192 renders the current instruction as text 1010 on first shelf digital display 730a indicating to "place a product" at a first location on first shelf 720a and checkmarks beneath the remaining products 830b-830d on first shelf 720a. In response to an indication that product 1002 is placed on first shelf 720a, such as an employee selecting button 806 indicating completion of the action, the execution process continues to a further instruction of the instruction set.

Figure 11:
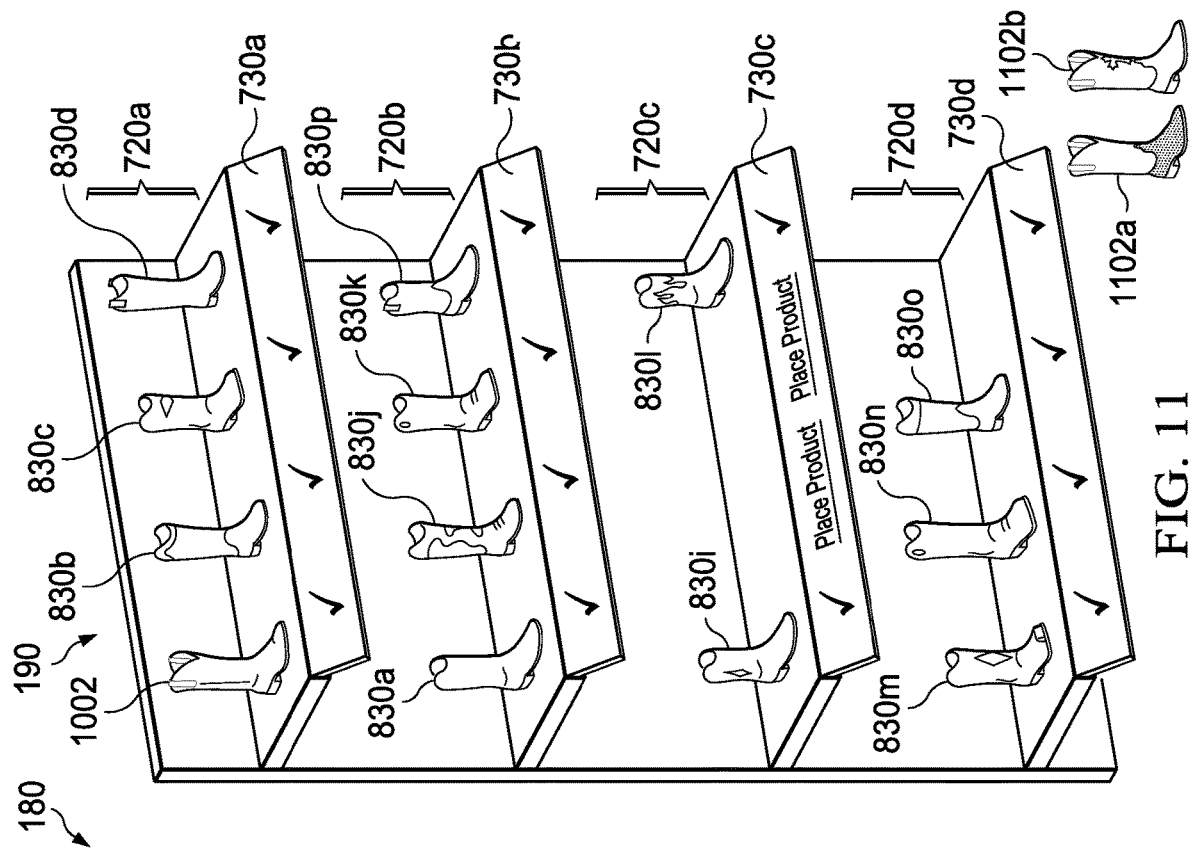

FIG. 11 illustrates interactive planogram 804 on mobile device 180 and digital signage 192, according to an embodiment. Continuing with the exemplary basic changes task 504, interactive planogram 804 represents a further instruction of the instruction set. Interactive planogram 804 is associated with textual instruction 802 that directs the employee to place products 1102a-1102b on third shelf 720c. Interactive planogram 804 illustrates products 1102a-1102b with product images 1104a-1104b and product description 1006. Similar to the previous instruction, products 1102a-1102b are a type of cowboy boot that comprises an associated description, the number of units in stock, and selectable "Find it" button 1008. Digital signage 192 renders the current instruction as text 1010 on third shelf digital display 730c indicating to "place a product" at a second and third location on third shelf 730c and checkmarks beneath the remaining products 830i and 830p on first shelf 730c.

In response to an indication that products 1102a-1102b are placed on third shelf 720c, such as an employee selecting button 806 indicating completion of the action, the execution process continues to a further instruction of the instruction set.

Figure 12:
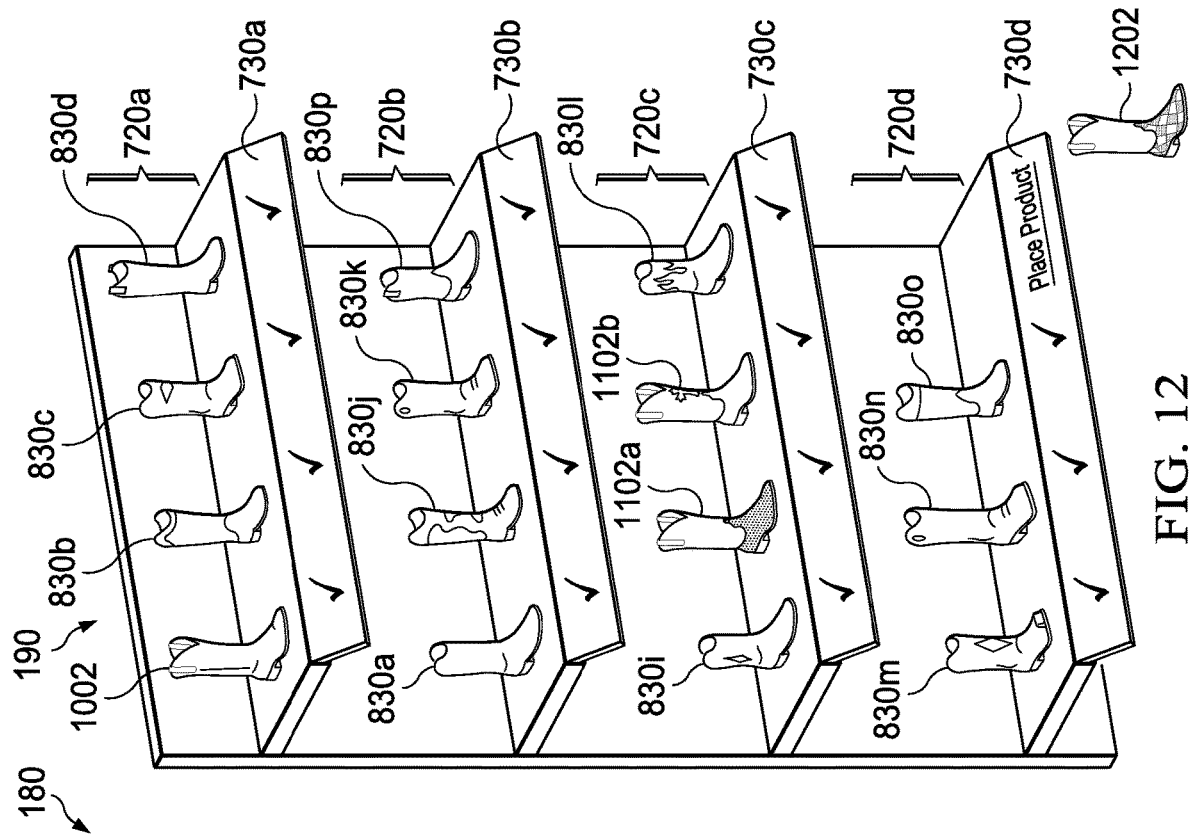
Figure 12:
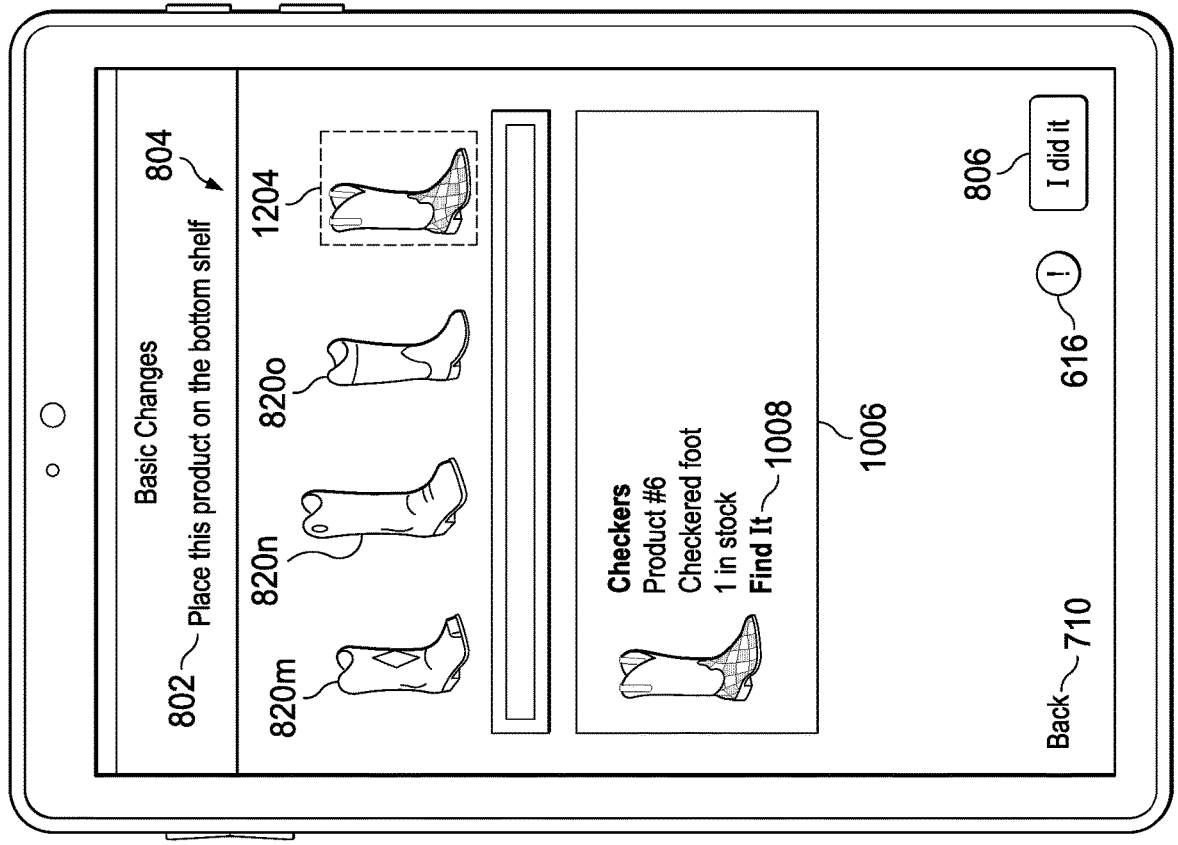

FIG. 12 illustrates interactive planogram 804 on mobile device 180 and digital signage 192, according to an embodiment. Continuing with the exemplary basic changes task 504, interactive planogram 804 represents a further instruction of the instruction set. Interactive planogram 804 and associated textual instruction 802 are dynamically updated to direct the employee to place product 1202 on fourth shelf 720d. Products 1202 is represented by product image 1204 and product description 1006. Similar to the previous instruction, product 1202 is a cowboy boot. Fourth shelf digital display 730*d* displays the rendered instruction as text 1010 indicating to "place a product" at a fourth location on fourth shelf 720*d*. In response to an indication that product 1202 is placed on fourth shelf 720*d*, such as an employee selecting button 806 indicating completion of the action, the execution process determines that the current instruction is the final instruction in the instruction set and advances to display a task completion screen on mobile device 180 and digital signage 192.

Figure 13:
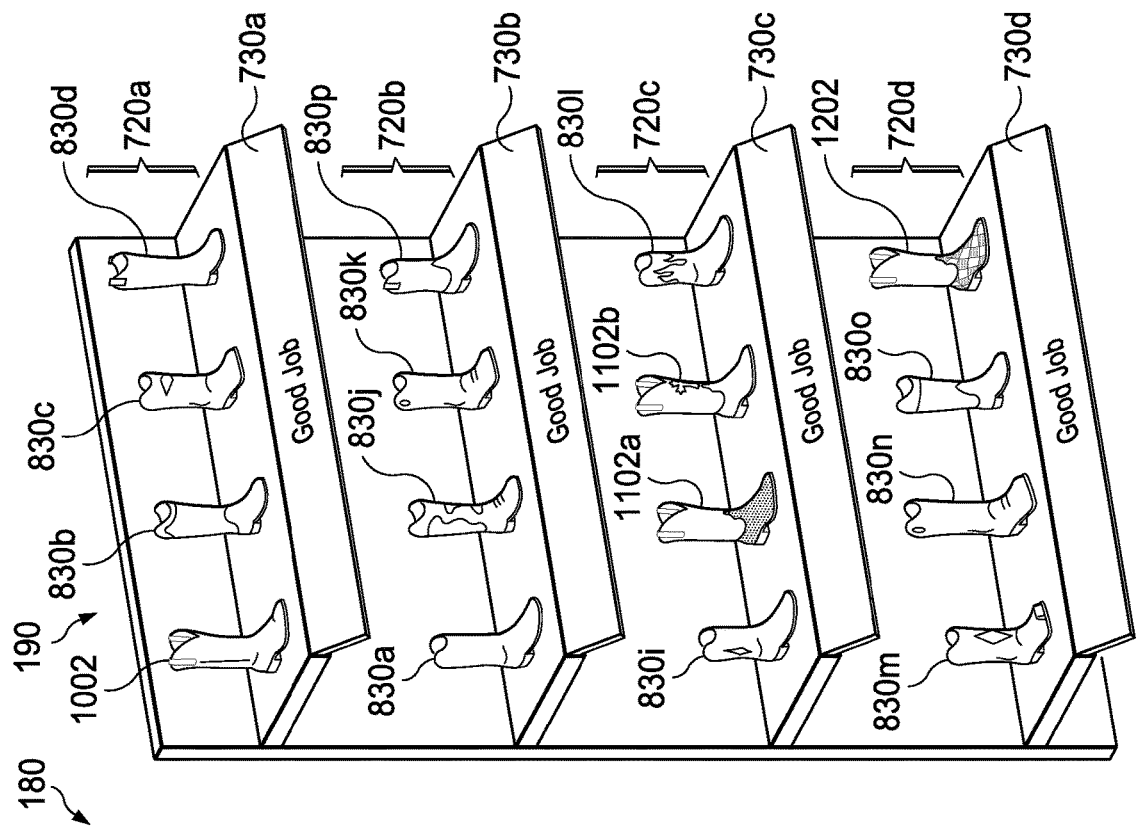
Figure 13:
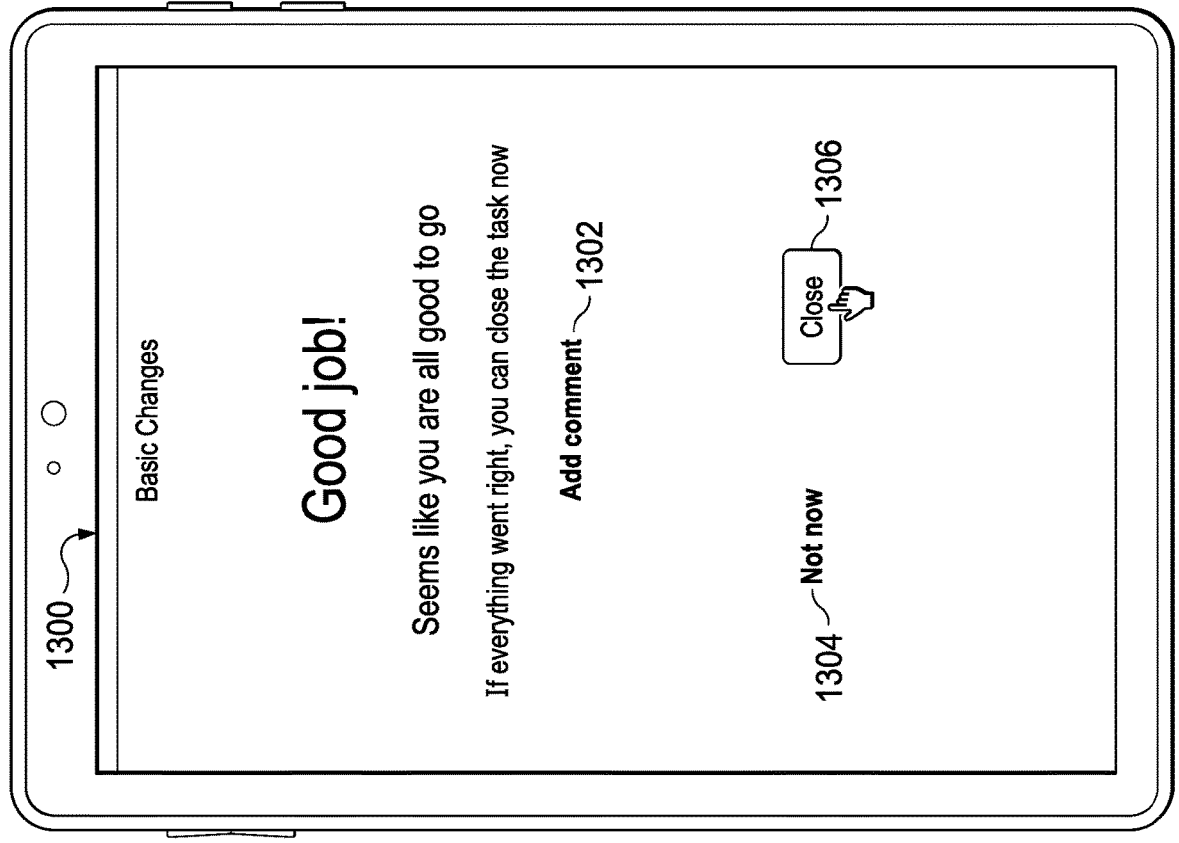

FIG. 13 indicates task completion notification 1300 on mobile device 180 and digital signage 192, according to an embodiment. According to embodiments, execution engine 210 displays task completion notification 1300 that indicates the task is completed. According to embodiments, task completion notification 1300 comprises "add comment" button 130 that, in response to selection by an employee, provides for entering text to send an issue to retail headquarters 122 indicating an issue with one or more instructions, planograms, tasks, products, or the like. In addition, task completion notification 1300 provides an option to return to a previous instruction of task by selecting "not sure" button 1304, or to end the execution process by selecting "close" button 1306. In response to an employee selecting "close" button 1306, the execution process ends.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of planogram planning, comprising:
   a server comprising a processor and a memory, the server comprising an instruction builder which renders instruction blocks connected by one or more connectors and an execution engine configured to synchronize a display of the instruction blocks on a mobile device and a digital display, wherein at least one of the instruction blocks is based on a location of the mobile device and a relative position of a shelving system within a retail store, and wherein at least one of the instruction blocks comprises an inventory instruction block corresponding to an instruction block for querying an inventory and displaying an inventory level;
   the mobile device comprising a processor and a memory, the mobile device configured to display instructions on the mobile device synchronized with graphics of the digital display, the display instructions comprising the rendered instruction blocks, wherein at least one of the instruction blocks comprises a planogram instruction block and wherein the synchronized graphics are displayed on the digital display in response to GPS location information being retrieved from a sensor on the mobile device and the relative position of the shelving system; and
   the digital display comprising a processor and a memory, the digital display configured to display graphics comprising at least one of the rendered instruction blocks, the digital display further configured to display arrows and checkmarks beneath products indicating whether to move a product or leave it in a current placement.

2. The system of claim 1, wherein the server further comprises a planogram creator, the planogram creator designs a planogram, and the planogram is executed according to the instructions displayed on the mobile device.

3. The system of claim 1, wherein the mobile device receives the instructions comprising the rendered instruction blocks and the digital display receives the graphics comprising the rendered instruction blocks from the server.

4. The system of claim 3, wherein the mobile device displays a first instruction comprising a rendered first instruction block and the mobile device display a second instruction comprising a rendered second instruction block, wherein the first instruction block is connected to the second instruction block by at least one connector of the one or more connectors.

5. The system of claim 4, wherein the first instruction block is connected to the second instruction block and a third instruction block, and selection of an option associated with the first instruction block causes the mobile device to not display the second instruction comprising the rendered second instruction block.

6. The system of claim 1, further comprising:
   a digital signage comprising the digital display; and
   the digital display is coupled with a shelving system.

7. A computer-implemented method of planogram planning, comprising:
   generating a computer-readable instruction set comprising instruction blocks connected by one or more connectors, wherein at least one of the instruction blocks is based on a location of a mobile device and a relative position of a shelving system within a retail store;
   displaying instructions rendered from the instruction blocks on the mobile device, the instructions synchronized with graphics of a digital display, wherein at least one of the instruction blocks comprises a planogram instruction block, and wherein at least one of the instruction blocks comprises an inventory instruction block corresponding to an instruction block for querying an inventory and displaying an inventory level;
   displaying graphics rendered from at least one of the instruction blocks on the digital display, wherein the displayed graphics comprise displayed arrows and checkmarks beneath products indicating whether to move a product or leave it in a current placement; and
   synchronizing the displayed instructions on the mobile device with the displayed graphics on the digital display, wherein the synchronized graphics are displayed on the digital display in response to GPS location information being retrieved from a sensor on the mobile device and the relative position of the shelving system.

8. The computer-implemented method of claim 7, further comprising: generating computer-readable planogram; and executing the planogram according to the instructions displayed on the mobile device.

9. The computer-implemented method of claim 7, further comprising:
   rendering the instructions and the graphics from a same instruction block by a server;
   receiving the rendered instructions by the mobile device; and receiving the rendered graphics by the digital display.

10. The computer-implemented method of claim 9, further comprising:
- displaying, by the mobile device, a first instruction comprising a rendered first instruction block; and
- displaying, by the mobile device, a second instruction comprising a rendered second instruction block, wherein the first instruction block is connected to the second instruction block by at least one connector of the one or more connectors.

11. The computer-implemented method of claim 10, wherein the first instruction block is connected to the second instruction block and a third instruction block, and selection of an option associated with the first instruction block causes the mobile device to not display the second instruction comprising the rendered second instruction block.

12. The computer-implemented method of claim 7, wherein a digital signage comprises the digital display coupled with a shelving system.

13. A non-transitory computer-readable medium comprising planogram planning software, the software, when executed, configured to:
- generate a computer-readable instruction set comprising instruction blocks connected by one or more connectors, wherein at least one of the instruction blocks is based on a location of a mobile device and a relative position of a shelving system within a retail store;
- render instructions for display on the mobile device, the instructions synchronized with graphics of a digital display, the instructions rendered from the instruction blocks, wherein at least one of the instruction blocks comprises a planogram instruction block, and wherein at least one of the instruction blocks comprises an inventory instruction block corresponding to an instruction block for querying an inventory and displaying an inventory level;
- render graphics for display on the digital display, the graphics rendered from at least one of the instruction blocks, wherein the rendered graphics comprise displayed arrows and checkmarks beneath products indicating whether to move a product or leave it in a current placement; and
- synchronize the displayed instructions on the mobile device with the displayed graphics on the digital display, wherein the synchronized graphics are displayed on the digital display in response to GPS location information being retrieved from a sensor on the mobile device and the relative position of the shelving system.

14. The non-transitory computer-readable medium of claim 13, wherein the software when executed is further configured to:
- generate a computer-readable planogram; and
- execute the planogram according to the instructions displayed on the mobile device.

15. The non-transitory computer-readable medium of claim 13, wherein the software when executed is further configured to:
- render the instructions and the graphics from a same instruction block by a server;
- receive the rendered instructions by the mobile device; and receive the rendered graphics by the digital display.

16. The non-transitory computer-readable medium of claim 15 wherein the software when executed is further configured to:
- render for display by the mobile device, a first instruction comprising a rendered first instruction block; and
- render for display by the mobile device, a second instruction comprising a rendered second instruction block, wherein the first instruction block is connected to the second instruction block by at least one connector of the one or more connectors.

17. The non-transitory computer-readable medium of claim 16, wherein the first instruction block is connected to the second instruction block and a third instruction block, and selection of an option associated with the first instruction block causes the mobile device to not display the second instruction comprising the rendered second instruction block.

* * * * *